US009226567B2

(12) United States Patent
Potter et al.

(10) Patent No.: US 9,226,567 B2
(45) Date of Patent: *Jan. 5, 2016

(54) HOLDING AID FOR A PERSONAL, HAND-HELD, TABLET-SHAPED DEVICE AND METHODS OF USE

(71) Applicant: Kernelope Holdings, LLC, Larkspur, CO (US)

(72) Inventors: Christine Potter, Larkspur, CO (US); Daniel Russell Potter, II, Larkspur, CO (US)

(73) Assignee: Kernelope Holdings, LLC, Larkspur, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,060

(22) Filed: May 18, 2015

(65) Prior Publication Data

US 2015/0272307 A1    Oct. 1, 2015

Related U.S. Application Data

(63) Continuation of application No. 14/181,722, filed on Feb. 16, 2014, now Pat. No. 9,033,384, which is a continuation-in-part of application No. 13/926,857, filed on Jun. 25, 2013, now Pat. No. 8,690,211, which is a continuation of application No. 13/394,483, filed as application No. PCT/US2011/027742 on Mar. 9, 2011, now Pat. No. 8,480,144.

(51) Int. Cl.
*B65G 7/12* (2006.01)
*A45F 5/10* (2006.01)
(Continued)

(52) U.S. Cl.
CPC ... *A45F 5/10* (2013.01); *A45F 5/00* (2013.01); *F16M 13/022* (2013.01); *F16M 13/04* (2013.01);
(Continued)

(58) Field of Classification Search
CPC ..... A45F 5/10; A45F 2005/1086; A45F 5/00; F16M 13/022; F16M 13/04; G06F 1/1628
USPC ......... 294/25, 29.1, 137, 139, 212, 219, 27.1; 361/679.3, 679.55, 679.56, 679.58, 361/679.03; 248/682, 444, 450; 224/217, 224/218, 930
See application file for complete search history.

(56) References Cited

U.S. PATENT DOCUMENTS

| 4,020,527 | A | 5/1977 | O'Niell |
| 4,202,139 | A | 5/1980 | Hong et al. |

(Continued)

FOREIGN PATENT DOCUMENTS

| IT | WO2009081223 | 7/2009 |
| JP | 2002199070 A | 7/2002 |

(Continued)

OTHER PUBLICATIONS

International Search Report for International Application No. PCT/US2011/027742, dated Nov. 18, 2011.

(Continued)

*Primary Examiner* — Gabriela Puig
(74) *Attorney, Agent, or Firm* — Startup IP Law, LLC; Terrence M. Wyles, Esq.

(57) ABSTRACT

A kit for a securement device to make it much easier for a user to securely hold onto a personal, hand-held, tablet-shaped device such as an electronic reader, a tablet computing device, a cellular phone, a personal data assistant, and a common clipboard, including any of these items that are at least partially contained in protective housings—while minimizing the fatigue and discomfort on the user's hands: A typical device solves this problem by providing a system of one or more finger holds formed with a fabric or pliable material that are disposed on the back side of the personal, hand-held, tablet-shaped device. In many devices, the position and fit of the finger holds are easily adjustable by a user via hook-and-loop schemes.

20 Claims, 12 Drawing Sheets

(51) Int. Cl.
*F16M 13/04* (2006.01)
*G06F 1/16* (2006.01)
*A45F 5/00* (2006.01)
*F16M 13/02* (2006.01)

(52) U.S. Cl.
CPC ......... *G06F 1/1628* (2013.01); *A45F 2005/008* (2013.01); *A45F 2005/1086* (2013.01); *A45F 2200/0516* (2013.01); *A45F 2200/0525* (2013.01)

(56) References Cited

U.S. PATENT DOCUMENTS

| | | | |
|---|---|---|---|
| 4,903,932 | A | 2/1990 | Stewart |
| 5,337,985 | A | 8/1994 | Hale |
| 5,385,283 | A | 1/1995 | Shioda |
| 5,713,548 | A | 2/1998 | Boyer |
| 6,269,948 | B1 | 8/2001 | Jackson |
| 6,381,127 | B1 | 4/2002 | Maddali |
| 6,527,300 | B1 | 3/2003 | Moss |
| 6,568,650 | B2 | 5/2003 | Helmetsie |
| 6,663,072 | B1 | 12/2003 | Ritchey |
| 6,758,332 | B2 | 7/2004 | Miller |
| 6,819,554 | B2 | 11/2004 | Juneau |
| 7,416,356 | B2 | 8/2008 | Quilantan |
| 7,455,339 | B2 | 11/2008 | Staples |
| 7,546,995 | B2 | 6/2009 | Axel |
| D633,504 | S | 3/2011 | Alexander |
| 8,528,798 | B2 | 9/2013 | Chen |
| 9,038,871 | B2 * | 5/2015 | Atwood et al. ............... 224/218 |
| 2003/0132127 | A1 | 7/2003 | Miller |
| 2005/0205623 | A1 | 9/2005 | Buntain |
| 2006/0231704 | A1 | 10/2006 | Storey |
| 2007/0051766 | A1 | 3/2007 | Spencer |
| 2009/0219677 | A1 | 9/2009 | Mori et al. |
| 2009/0270050 | A1 | 10/2009 | Brown |
| 2009/0283559 | A1 | 11/2009 | Foggiato |
| 2010/0122439 | A1 | 5/2010 | Britton et al. |
| 2010/0222118 | A1 | 9/2010 | Interdanato |
| 2010/0264181 | A1 | 10/2010 | Gray |
| 2010/0296235 | A1 | 11/2010 | Takemasa et al. |
| 2011/0266316 | A1 | 11/2011 | Ghalib et al. |
| 2011/0303709 | A1 | 12/2011 | Wizikowski |
| 2012/0031937 | A1 | 2/2012 | Baker |

FOREIGN PATENT DOCUMENTS

| | | |
|---|---|---|
| JP | 2009124652 A | 6/2009 |
| JP | 2010171731 A | 8/2010 |
| JP | 2011035810 A | 2/2011 |
| KR | 1020050055969 A | 6/2005 |

OTHER PUBLICATIONS

Written Opinion of the International Searching Authority for International Application No. PCT/US2011/027742, dated Nov. 18, 2011.
European Patent Office (EPO) Examination and Search Report, dated Nov. 7, 2014 an Nov. 14, 2014 respectively, for EPO Application No. 11860483.4—1953/2684102 (EPO Stage of PCT/US2011/027742); 7 pages.
Web Article: "Combining the iPad with Velcro? Looks good to us"; available at http://www.cnet.com/news/combining-the-ipad-with-velcro-looks-good-to-us/; last accessed on Apr. 10, 2014.

* cited by examiner

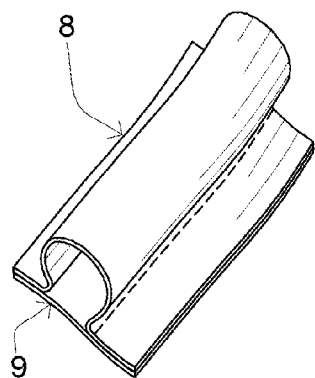
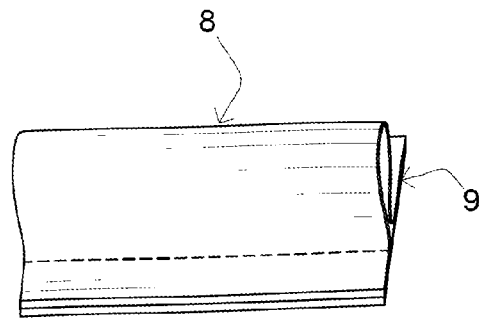
FIG. 11A  FIG. 11B
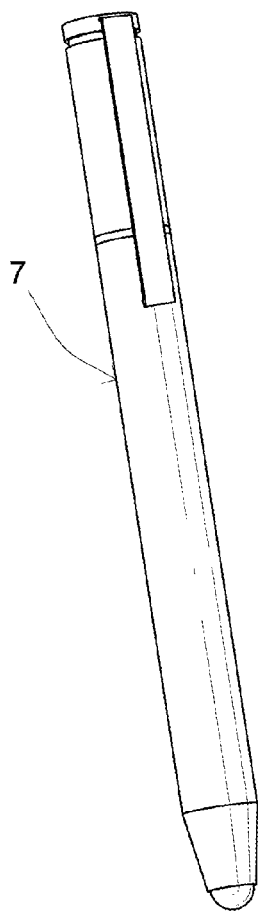
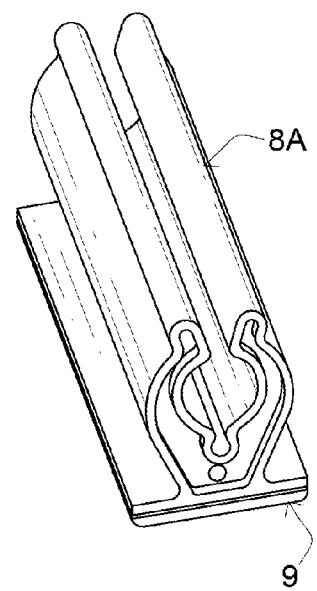
FIG. 12  FIG. 13

HOLDING AID FOR A PERSONAL, HAND-HELD, TABLET-SHAPED DEVICE AND METHODS OF USE

CROSS-REFERENCE TO RELATED APPLICATIONS

The present patent application is a Continuation of U.S. patent application Ser. No. 14/181,722, filed on Feb. 16, 2014, for "Holding Aid for a Personal, Hand-Held, Tablet-Shaped Device and Methods of Use" (currently Allowed and scheduled to issue as U.S. Pat. No. 9,033,384 on May 19, 2015); which is a Continuation-in-Part of U.S. patent application Ser. No. 13/926,857, filed on Jun. 25, 2013, for "Holding Aid for a Personal, Hand-Held, Tablet-Shaped Device and Methods of Use" (now U.S. Pat. No. 8,690,211, issued on Apr. 8, 2014); which is a Continuation of U.S. patent application Ser. No. 13/394,483, filed on Mar. 6, 2012, for "Holding Aid for a Personal, Hand-Held, Tablet-Shaped Device and Methods of Use" (now U.S. Pat. No. 8,480,144, issued on Jul. 9, 2013); which is the U.S. National-Stage Entry for Patent Cooperation Treaty (PCT) Application No. PCT/US2011/027742, filed on Mar. 9, 2011, for "Holding Aid for a Personal, Hand-Held, Tablet-Shaped Device and Methods of Use".

The present patent application claims the benefit of each of the aforementioned four cross-referenced patent applications, and hereby incorporates by reference each of the four aforementioned patent applications in their entirety for all purposes.

BACKGROUND

The marketplace has seen the proliferation of many types of personal, hand-held, electronic devices over the last decade or so. Such devices are typically thin and tablet-shaped, and include the popular electronic readers (so-called "e-readers"), such as the Amazon Kindle®, Barnes & Noble Nook®, and the Sony eReader®. Other similar devices include new versions of tablet computers such as the Apple iPad®, Google Android®, and many other related devices in an ever-expanding market. A primary and very popular use for these types of personal electronic devices is to display and read electronic books in lieu of a traditional bound, typeset book. In addition, most of these types of devices also support the display and viewing of various other types of media; e.g., photos, web pages, video, etc.

The manufacturers of such personal, hand-held, electronic devices generally try to design them to be fairly thin and relatively light-weight so that users are not overly burdened to store, carry, and hold the devices. Nevertheless, a typical user may spend many hours reading in a given setting, such as relaxing to read while in a reclining chair or bed, and often finds it uncomfortable to have to grip the device over such a long period of time due to fatigue or even cramping. In addition, users often find themselves needing to do other things; e.g., moving around, getting a cup of coffee, etc.; and can find themselves inadvertently fumbling with their hand-held tablet-shaped device and/or dropping the device altogether. Similarly, if a user chooses to try and hold such a device without gripping it, and instead merely balance it on the user's hand(s), that can prove to be taxing on a user over an extended period of time as well.

There are devices known for assisting a user in the holding of a book, a clipboard, and the like, in settings where there is no readily available platform such as a podium or table to conveniently set down the book or clipboard while reading from it. Many of those solutions are directed to detachably mounting the book or tablet-shaped item onto some sort of fixed structure to free a user's hands during use. In other solutions that are specifically directed to a traditional book, a strap is provided along the spine of the book for a user to slip his or her hand through such that the spine of the book rests in the palm of the user hand while the strap exerts pressure on the back side of the user's hand to allow the user to hold the book without much effort. This latter solution is somewhat impractical to employ for a personal, hand-held, tablet-shaped electronic device, and the security of the user's hold on the device is not optimum, especially when one considers the monetary investment made to obtain the electronic device in the first place.

BRIEF DESCRIPTION OF THE DRAWINGS

FIGS. 11A-11B depict two views of one embodiment of a stylus-grip member.

FIG. 12 depicts one embodiment of a generic stylus (known in the art).

FIG. 13 depicts one embodiment of an alternate "clip-type" of stylus-grip member.

DETAILED DESCRIPTION

Overview

Figure 1:
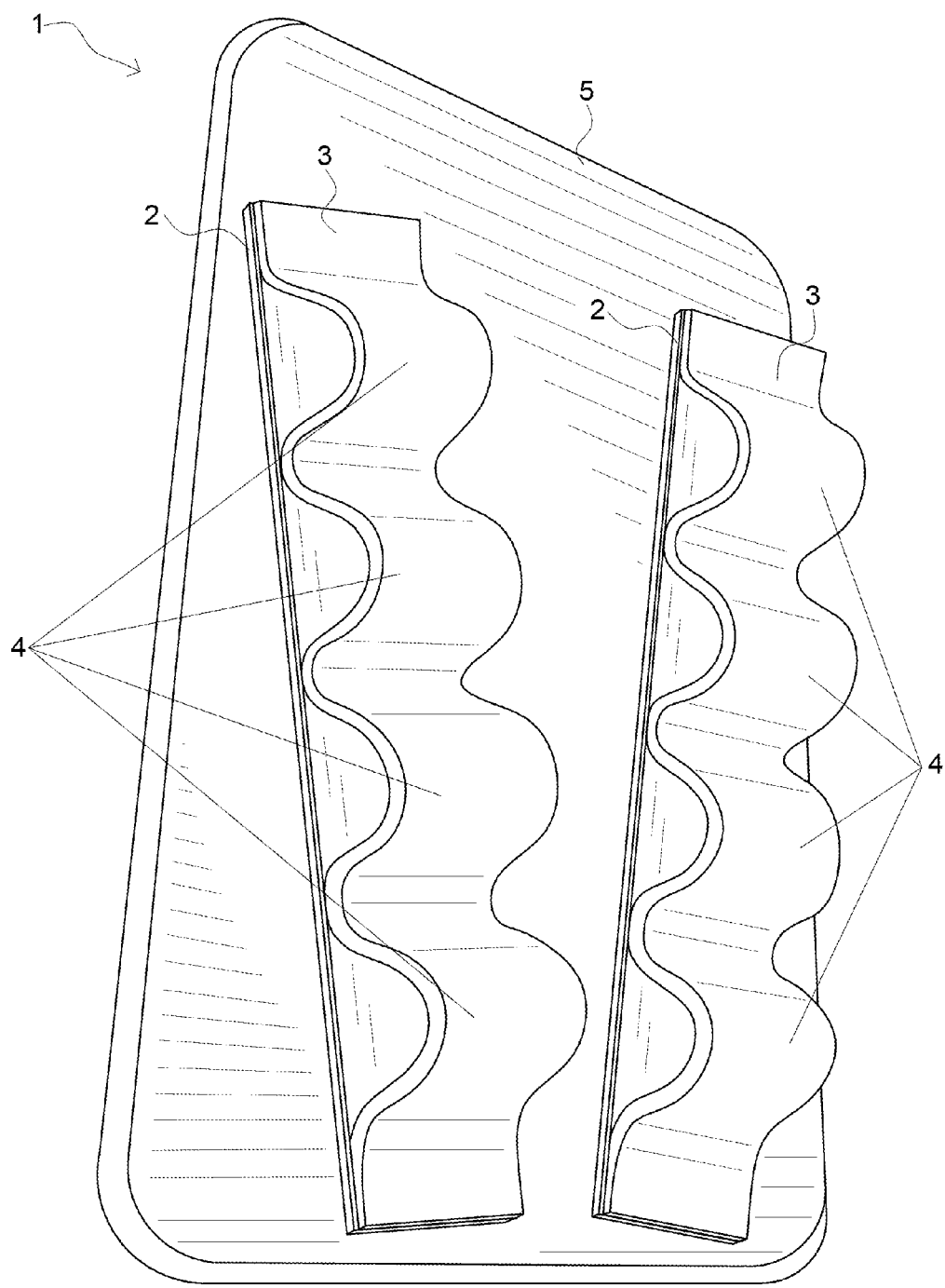
FIG. 1 depicts one embodiment of the back-panel side of a personal, hand-held, tablet-shaped device, such as an e-reader, to which is attached a pair of back-panel coupling members, each of which is comprised of an adhesively attached strip for secure attachment to the back panel of the personal, hand-held, tablet-shaped device. The outer side of each back-panel coupling member comprises one mating part of coupling system for coupling with a finger-grip member. Often this coupling system is hook-and-loop coupling system. Each finger-grip member that is coupled to its respective back-panel coupling member has at least one aperture adapted for receiving a user finger.

The present disclosure is directed generally to a securement device to make it much easier for a user to securely hold onto a personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, a personal data assistant (PDA), and even just a common clipboard—while minimizing the fatigue and discomfort on the user's hands. A typical embodiment of the present inventive disclosure solves this problem by providing a system of one or more finger holds formed with a fabric or pliable material (e.g., polypropylene, nylon, neoprene, cloth, vinyl, rubber, elastomeric material, etc.) that are disposed on the back side of the personal, hand-held, tablet-shaped device.

Taking a Kindle® e-reader in one embodiment, the e-reader has an attached mat of one side of a hook-and-loop coupler (usually, this would be the "loop" part) to the back side of the e-reader. This mat could be one large mat, or a plurality of strips or patches of matting. In any event, a user can attach to that mat one or more finger-grip members by way of the matching part of the hook-and-loop coupler. Each finger-grip member can have multiple apertures for receiving a user finger, with the apertures in each finger-grip member generally aligned in parallel with each other. The apertures are generally formed by intermittent secure attachment of a pliable and elastic material to a substrate adapted for detachable coupling with the aforementioned matting, thus forming a substantially sinusoidal pattern and being adapted to distribute the stress of inserted user fingers along the substrate adapted to detachably couple to the back-side the tablet-shaped device (e-reader).

In a variation for this e-reader example, there are two finger-grip members, each having four apertures designed to receive the four digits (excluding the thumb) on each of the user's hands. Because each finger-grip member is easily detachable (via the hook-and-loop coupling), each finger-grip member can be positioned any way a user finds more convenient. A user can even decide to employ only one of the finger-grip members.

In other embodiments, the finger-grip member can be attached on either of its longitudinal sides via the hook-and-loop coupling. In still other embodiments, the basic principle underlying the above-described embodiments could be applied to even cell phones, where perhaps there is only a single finger-grip member and that finger-grip member has only one or two apertures for receiving a user finger (or perhaps two user fingers) to help a user hold onto his or her cell phone while walking and doing various activities.

In even more variations, the securement device includes at least one stylus-grip member, configured similarly to a finger-grip member, except sized and adapted to receive a stylus, pen, pencil, or similar device for convenient detachable coupling to the same planar surface that the finger-grip member detachably couples to. Like the finger-grip member, the stylus-grip member can be attached and oriented in any direction that a user sees fit.

In still more embodiments, the securement device is built into, or installed onto, the back side of a protective cover that is designed to receive a personal, hand-held, tablet-shaped device. Such protective covers (or sometimes referred to in the art as "skins") can be made of plastic, rubber, silicone, or some other suitable material that can provide shock absorption and/or scratch resistance protection for the generally encased personal, hand-held, tablet-shaped device.

Of course, a secondary use of the back-side-mounted mat on the tablet-shaped device is to mount the personal, hand-held, tablet-shaped device on any surface that happens to have a mating part of a hook-and-loop coupling.

TERMINOLOGY

The terms and phrases as indicated in quotes (" ") in this section are intended to have the meaning ascribed to them in this Terminology section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification and the appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", and similar terms, as used in this patent application specification (including the claims and drawings), refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, and lateral are relative to each other, are dependent on the specific orientation of an applicable element or article, are used accordingly to aid in the description of the various embodiments, and are not necessarily intended to be construed as limiting in this specification and the appended claims.

As applicable, the terms "about" or "generally", as used herein unless otherwise indicated, means a margin of ±20%. Also, as applicable, the term "substantially" as used herein unless otherwise indicated means a margin of ±10%. It is to be appreciated that not all uses of the above terms are quantifiable such that the referenced ranges can be applied.

The terms "a personal, hand-held, tablet-shaped device" and "a personal tablet-shaped device", as used in this specification and the appended claims, generically refers to any substantially tablet-shaped, personal, hand-held electronic device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, and a personal data assistant (PDA). In alternative embodiments, term "a personal, hand-held, tablet-shaped device" can also refer to a common clipboard, or many other substantially tablet-shaped devices, including protective cases/coverings for substantially tablet-shaped, hand-held, electronic devices.

The terms "protective covering", "protective housing", and the like, as used in this specification and the appended claims, generically refers to any encasing protective covering or housing (sometimes referred to in the art as "skins") for personal, hand-held, electronic devices (typically made of plastic, rubber, silicone, or some other similar material) that is adapted to be installed over at least part of the exterior of such electronic devices, substantially covering the back panel of the electronic devices. Such protective coverings typically provide scratch resistance and/or shock absorption for the devices when dropped, mishandled, etc., while still having openings in the protective covering to allow a user to access controls and see the display screen; hence, such coverings are sometimes referred to herein as "partially encasing" an associated personal, hand-held, tablet-shaped device.

The term "stylus", as used in this specification and the appended claims, generically refers to any stylus for use with the touch screen/pad of a personal electronic device, and also is intended to encompass any type of pen, pencil, or any type of elongated tool or pointing device for which a user might find it convenient to detachably couple the item to a personal, hand-held, tablet-shaped device.

First Embodiment

An Ergonomic User-Hand-Engagement Apparatus for a Personal Tablet-Shaped Device

This embodiment is directed generally to an ergonomic user-hand-engagement apparatus for a personal, hand-held, tablet-shaped device designed to enable a user to easily and securely hold onto a personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a plain old clipboard—while minimizing the fatigue and discomfort on the user's hands.

Figure 2:
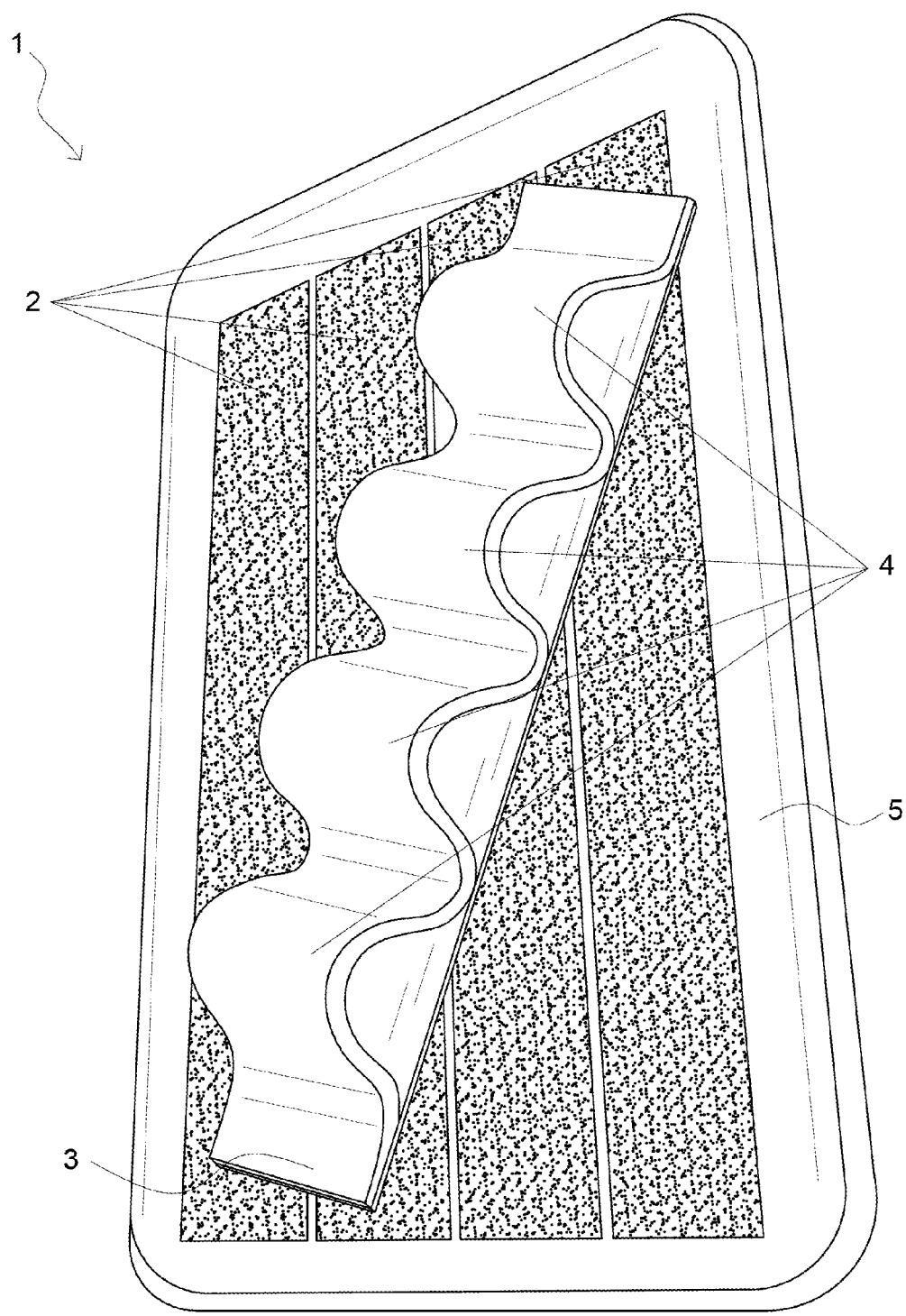
FIG. 2 depicts one embodiment of the back-panel side of a personal, hand-held, tablet-shaped device, such as an e-reader, to which is attached a plurality of back-panel coupling members that forms one big back-panel coupling member, each of which is comprised of an adhesively attached strip for secure attachment to the back panel of the personal, hand-held, tablet-shaped device. In a variation, instead of being a plurality of such strips, the back-panel coupling member can be a single wide mat of the same material. The outer side of the back-panel coupling member comprises one mating part of coupling system for coupling with one or more finger-grip members. Often this coupling system is hook-and-loop coupling system. Each finger-grip member that is coupled to the back-panel coupling member has at least one aperture adapted for receiving a user finger.
Figure 3:
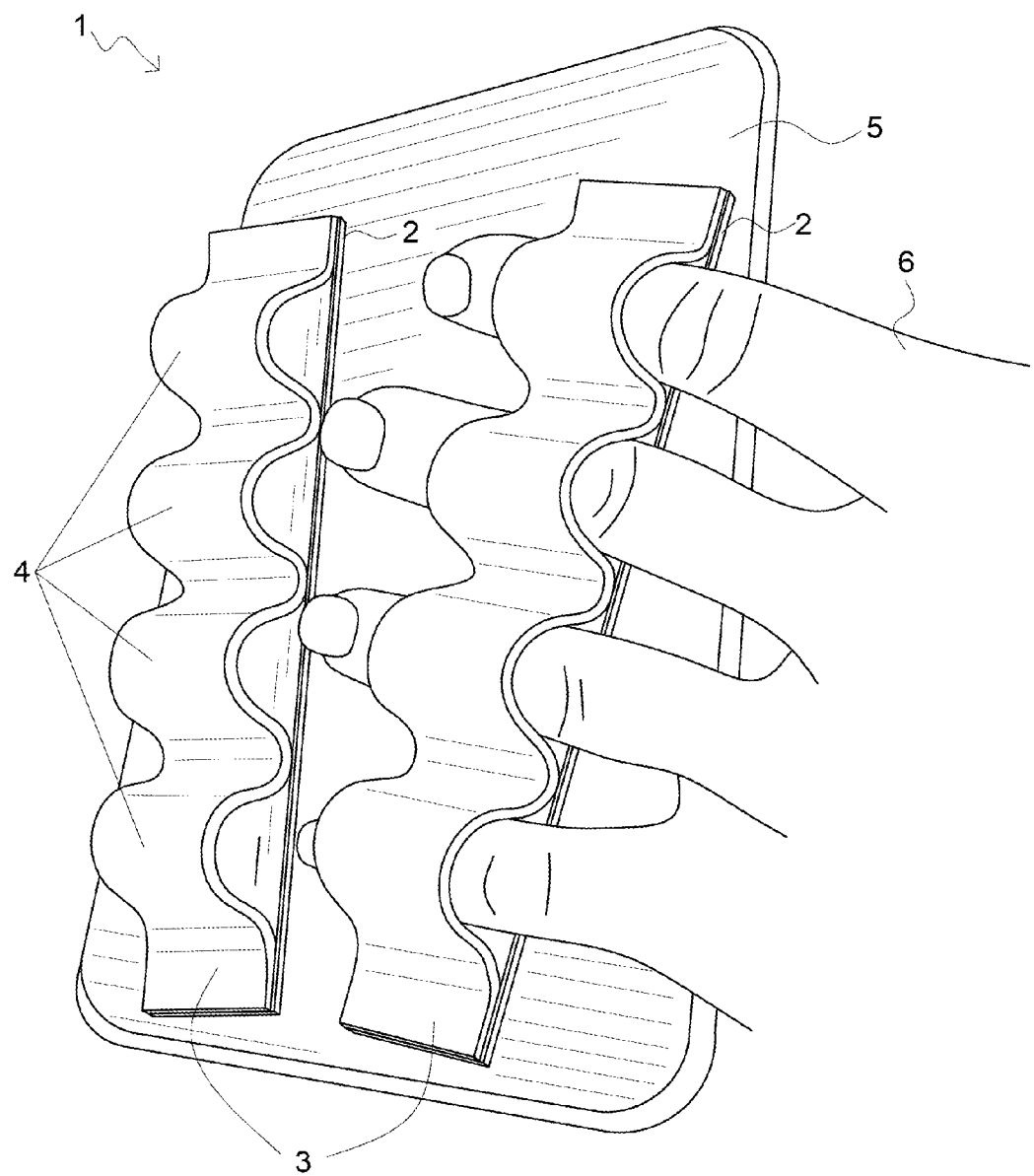
FIG. 3 depicts the embodiment of FIG. 1; however, this figure also shows an example of the engagement of one of the finger-grip members with four fingers of a user hand.
Figure 4:
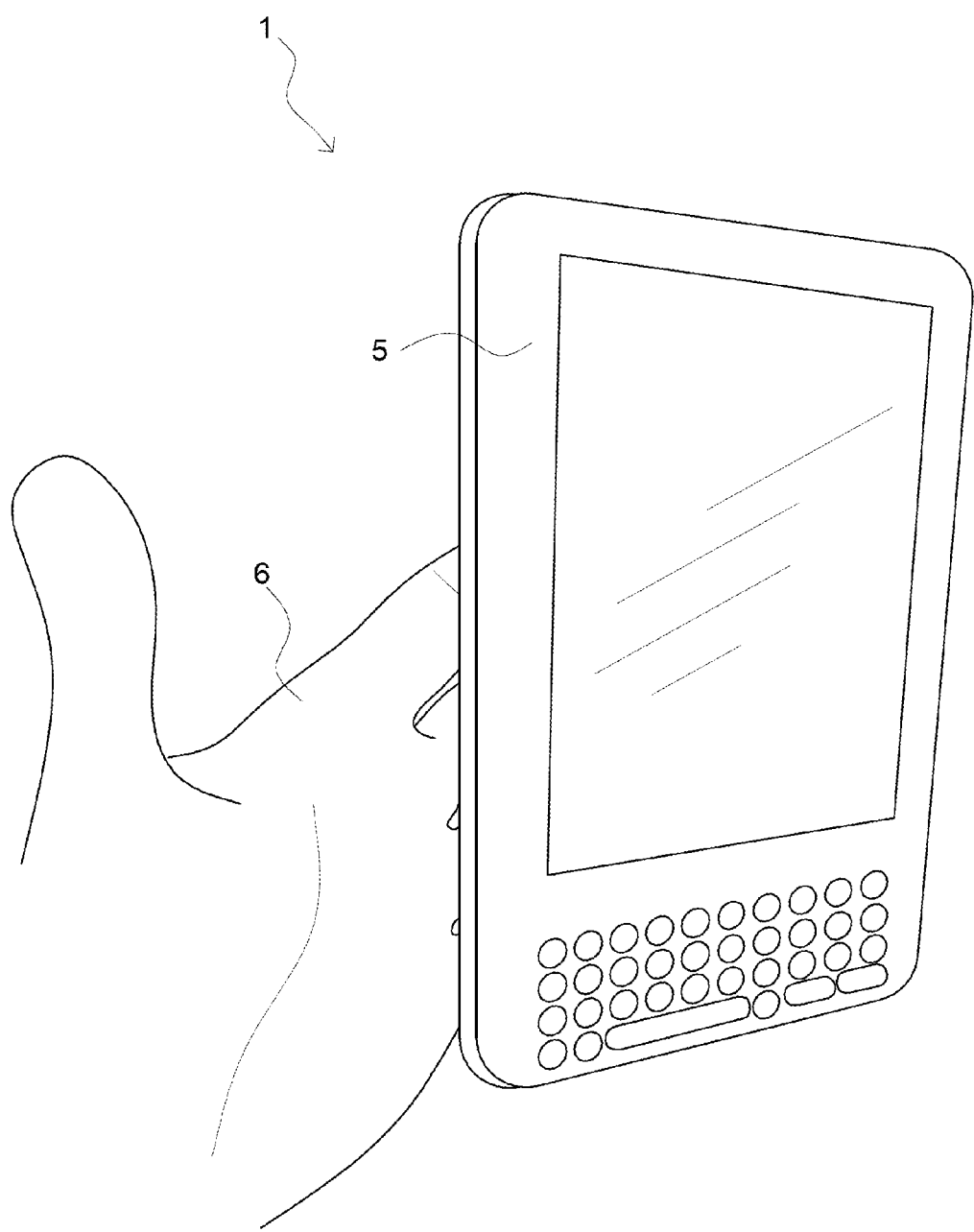
FIG. 4 depicts one embodiment of the front view of same embodiment shown in FIG. 3.
Figure 5:
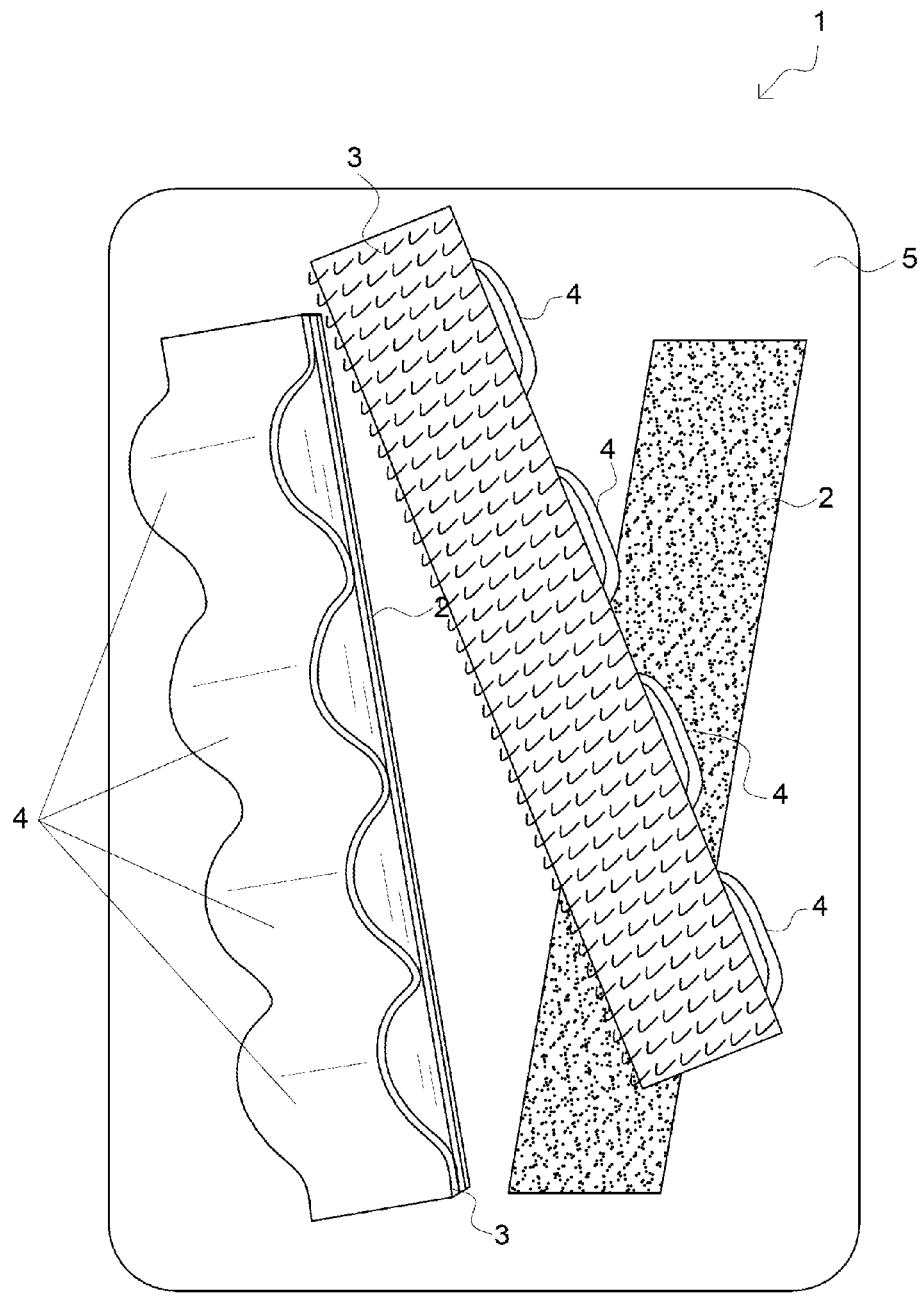
FIG. 5 depicts the embodiment of FIG. 1, except that one of the finger-grip members is shown detached from its back-panel coupling member and flipped over in order to show the finger-grip member's "hook" part of a hook-and-loop for coupling with a back-panel member.
Figure 6:
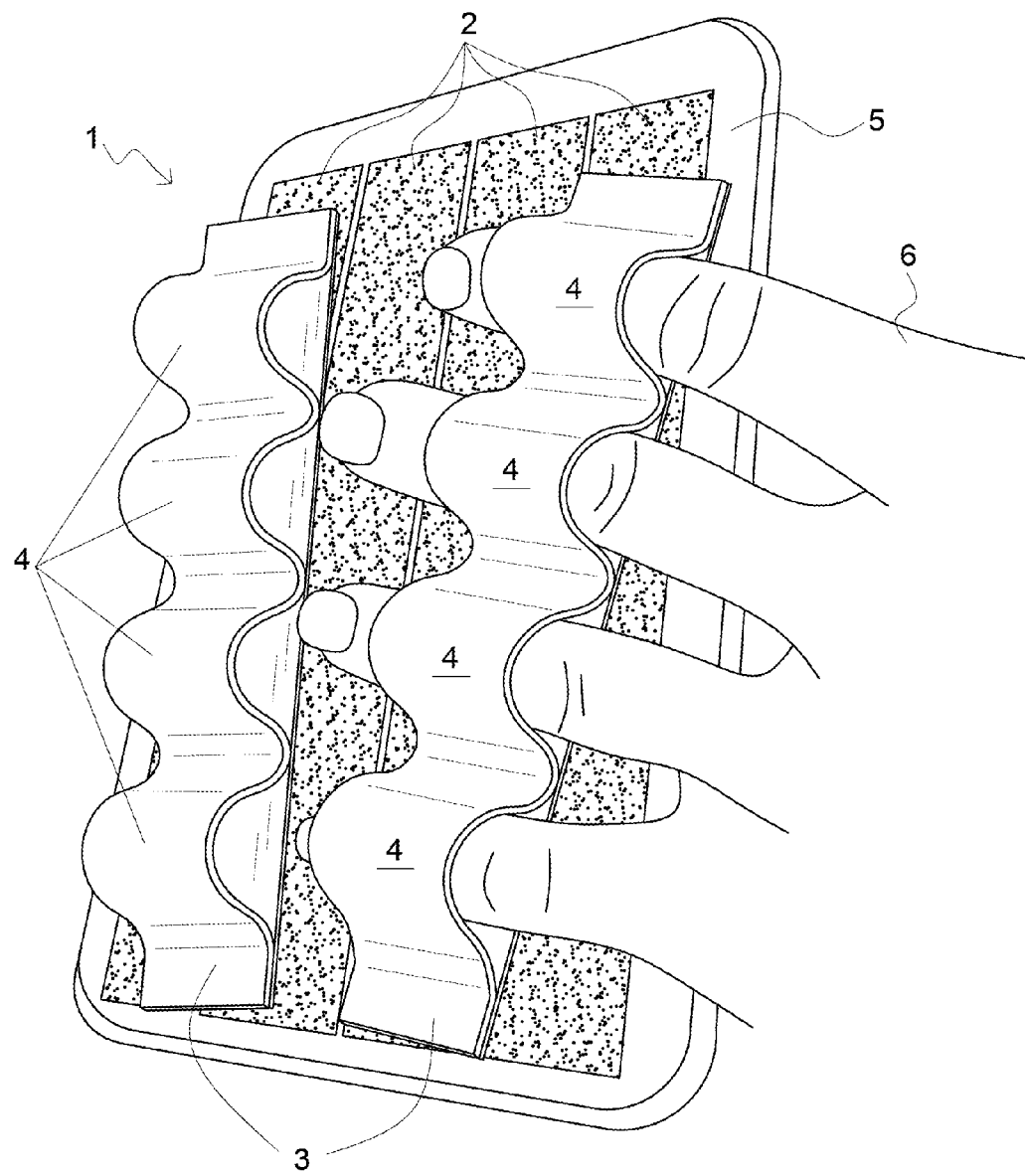
FIG. 6 depicts the embodiment of FIG. 2; however, this figure also shows an example of the engagement of one of the finger-grip members with four fingers of a user hand.
Figure 7:
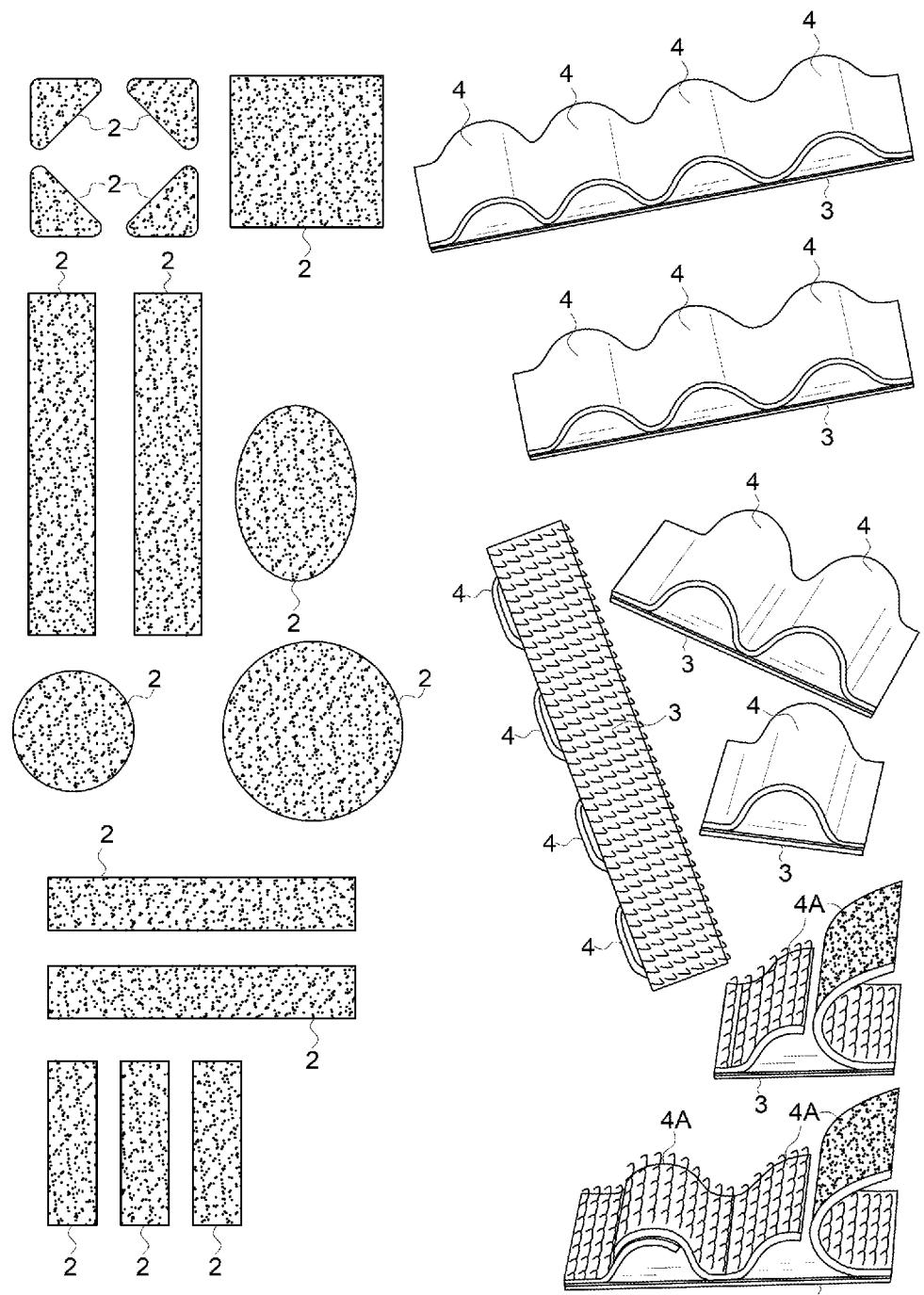
FIG. 7 depicts one embodiment of a set of variously sized and shaped back-panel coupling members and a set of variously sized finger-grip members that might be contained in a kit to facilitate a user's ability to assemble and install a securement apparatus on the back of a user-selected personal, tablet-shaped device. These depicted sets are not intended to limit the number and various sizes and shapes of such components that could be included in such a kit. In addition, this figure also shows two examples of a user-adjustable finger-grip aperture (see items 4A).
Figure 8:
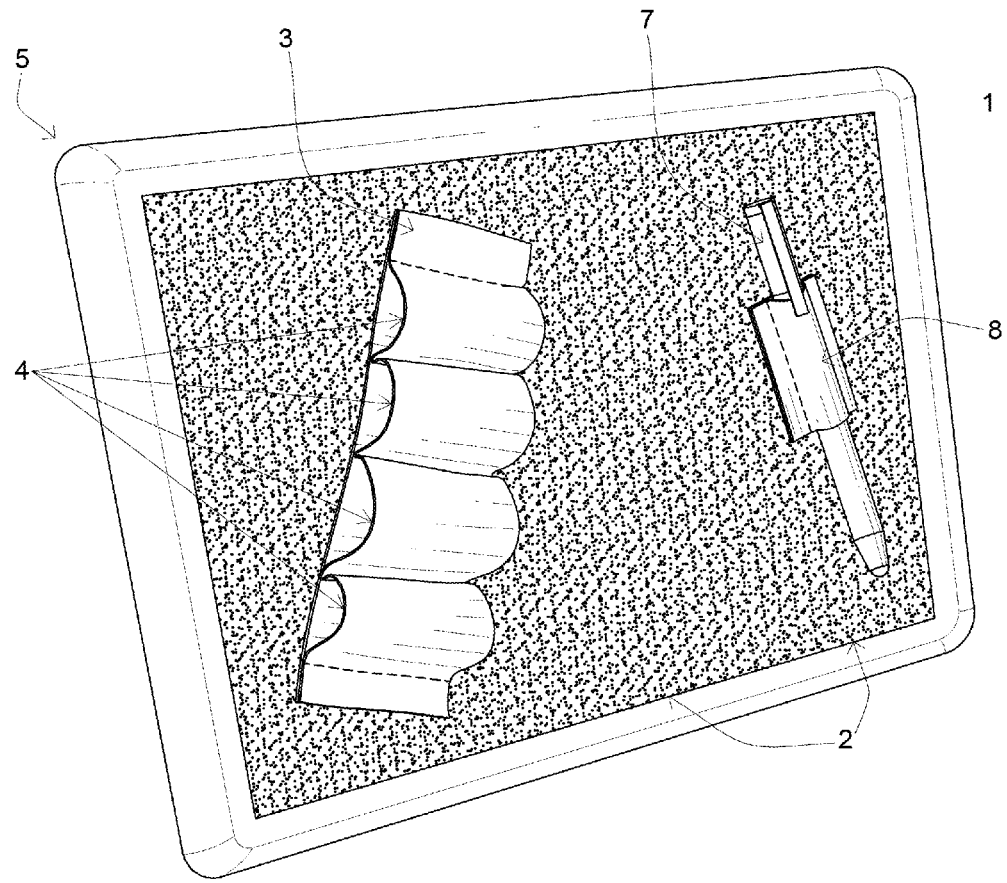
FIGS. 8-10 each depict one embodiment of the back-panel side of a personal, hand-held, tablet-shaped device, such as an e-reader, to which is attached at least on back-panel coupling member, which is comprised of an adhesively attached strip for secure attachment to the back panel of the personal, hand-held, tablet-shaped device. The outer side of each back-panel coupling member comprises one mating part of coupling system for coupling with a finger-grip member. Often this coupling system is hook-and-loop coupling system. Each finger-grip member that is coupled to its respective back-panel coupling member has at least one aperture adapted for receiving a user finger. In addition, each of these Figures depicts a removably coupled stylus-grip member for holding a stylus, pen, pencil, or similar tool on the back-panel coupling member.
Figure 9:
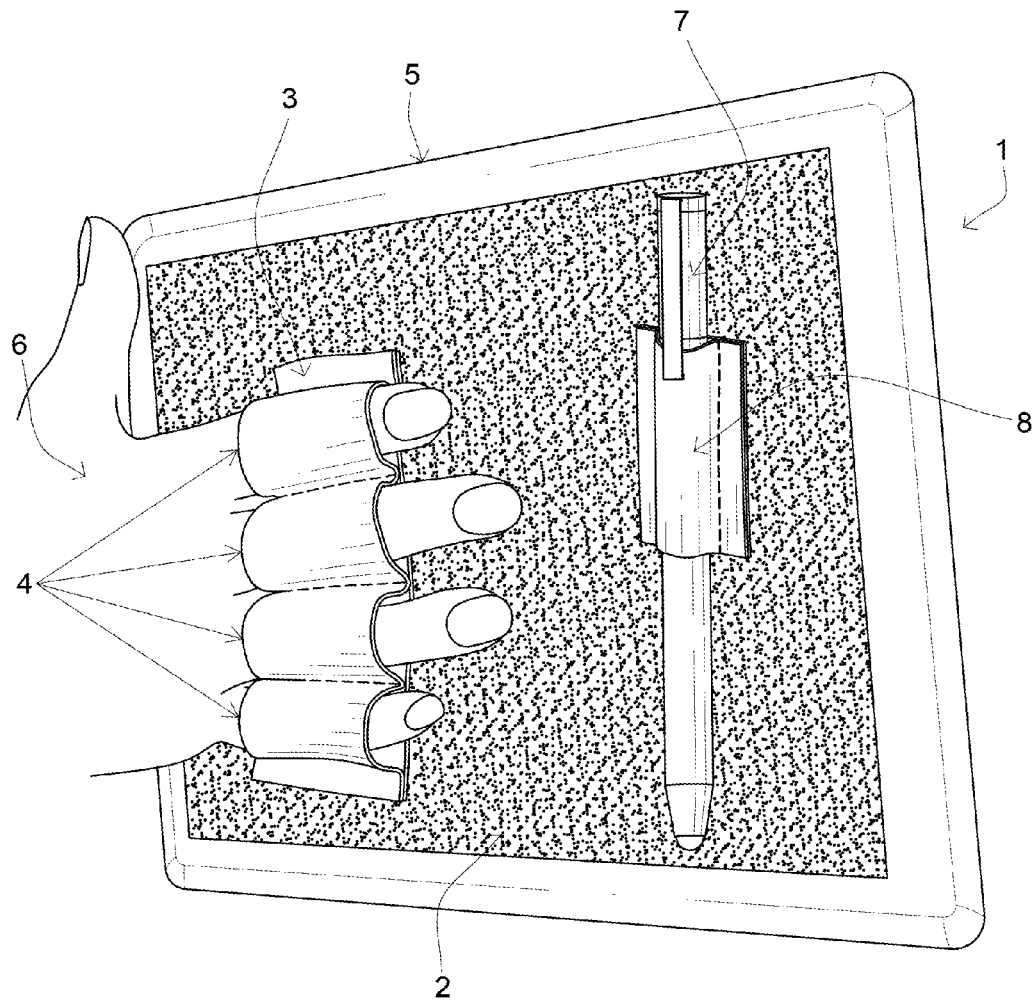
Figure 10:
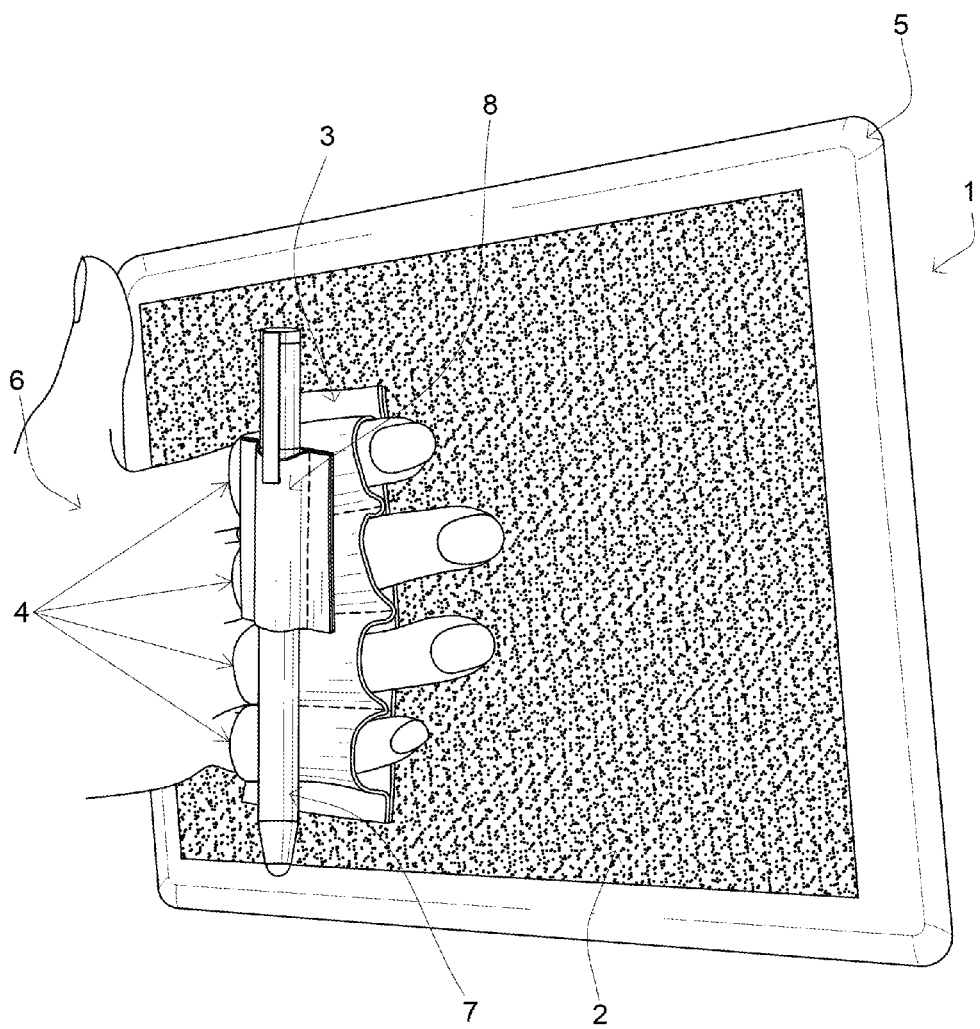
Figure 14:
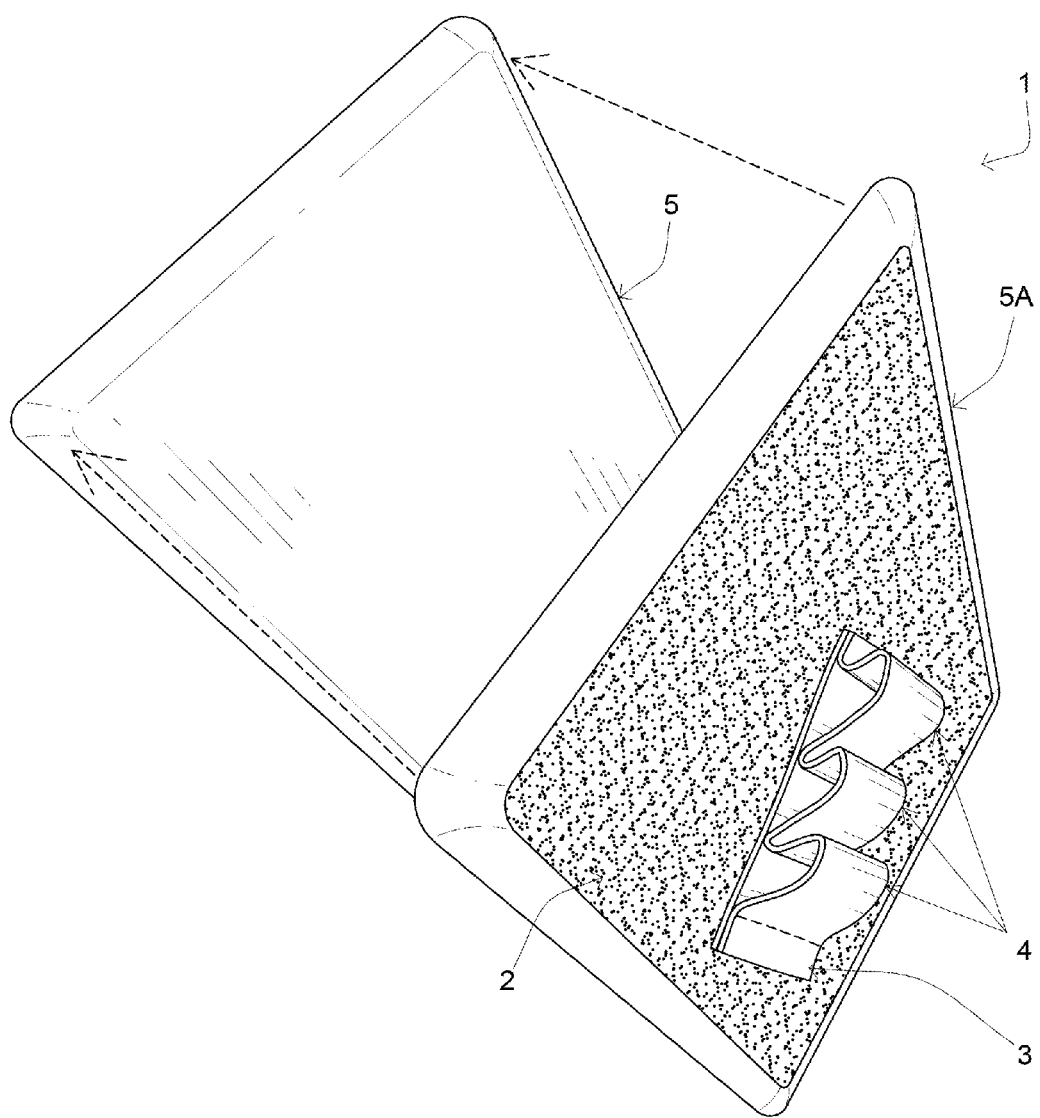
FIG. 14 depicts one embodiment of the Embodiment in FIG. 1, except that the securement device's back-panel coupling member is disposed on the rear-planar surface of a protective covering/housing for a portable, hand-held, electronic device.

Refer to FIGS. 1-14. A typical embodiment of the present inventive disclosure solves this problem by providing a system of one or more finger-grip members 3 formed with a fabric or pliable material that is comprised of polypropylene, nylon, neoprene, cloth, vinyl, rubber, or other suitable materials, wherein the finger-grip members 3 are detachably coupled to a the back panel of the personal, hand-held, tablet-shaped device 5 by way of a detachable coupling with one or more back-panel members 2, which in turn are securely attached to the back panel of the personal, hand-held, tablet-shaped device 5. Hereinafter, for exemplary purposes only, the term "personal, hand-held, tablet-shaped device" 5 will be substituted with "e-reader" 5; however, one skilled in the art would appreciate that myriad similarly shaped devices can be used with the ergonomic user-hand-engagement apparatus described herein, and therefore are contemplated to be encompassed by this embodiment.

In an embodiment, the e-reader 5 has an attached mat 2 (the back-panel coupling member 2) of one side of a hook-and-loop coupler (usually, this would be the "loop" part to aid in user comfort when handling the e-reader 5, and protect surfaces upon which the e-reader 5 might be laid) to the back side of the e-reader 5. This mat 2 could be one large mat, or a plurality of strips or patches of matting of various sizes and shapes that allow the back-panel coupling device 2 to be adapted to the topography of the back of the e-reader 5. In many variations, the mat 2 is attached to the back panel of the e-reader 5 using an adhesive medium.

In an embodiment, a user can attach to the mat 2 one or more finger-grip members 3 by way of the matching part of the hook-and-loop coupler. Each finger-grip member 3 can have one or more apertures 4 for receiving a user finger 6, with the apertures 4 in each finger-grip member 3 generally aligned in parallel with each other. In a variation, there are two finger-grip members 3, each having four apertures 4 designed to receive the four digits (excluding the thumb) on each of the user's hands 6. A user would have the option of engaging the e-reader 5 with one or both of the user's hands 6 with a respective finger-grip member 3. Because each finger-grip member 3 is easily detachable (via the hook-and-loop coupling), each finger-grip member 3 can be positioned on the back-panel coupling member 2 any way a user finds more convenient. A user can even decide to employ only one of the finger-grip members 3. In various embodiments, each finger-grip member 3 is comprised of a fabric or pliable material such as of polypropylene webbing, nylon, neoprene, cloth, terry cloth, vinyl, rubber, or other suitable materials, wherein the finger-receiving apertures 4 are formed by sewing or otherwise securely attaching (e.g., thermoplastic welding, adhesives, etc.) intermittent portions of the finger-grip aperture 4 material to the substrate that comprises the back-panel coupling surface on the side of the substrate opposite of the finger-grip apertures 4, thus forming a substantially sinusoidal wave shape with the finger-receiving aperture material.

In other variations of this embodiment, the detachable coupling scheme between the back-panel coupling member 2 and the finger-grip member(s) 3 can be by way of using mechanical snaps or magnetic coupling, wherein, obviously, both the back-panel coupling member and the finger-grip member(s) 3 would have to have the appropriate hardware built into them to support either of those coupling schemes.

In still other embodiments, the finger-grip member 3 can be attached to the back-panel coupling member 2 using either of the finger-grip member's 3 longitudinal sides via the coupling scheme used for the apparatus, discussed supra.

In some variations, the finger-grip member(s) 3 have size-adjustable finger-receiving apertures 4 so that a user can adjust the fit to the user's inserted finger(s) 6 to the user's preference and comfort. For example, in one such variation, one or more of the finger-receiving apertures 4 is a small strap that can be coupled at various lengths at least one end of the small strap to the substrate of the finger-grip member 3. In some other embodiments, the finger-grip apertures 4 are adapted to snuggly fit onto one or more inserted user fingers 6, wherein the material used to form the finger-grip aperture(s) 4 is elastic in nature and sized slightly smaller than the diameter of a targeted user's finger.

In still more variations, the securement device 1 incorporates at least one stylus-grip member 8, 8A that can be detachably coupled to the back-panel coupling member 2 by way of a coupling mating surface 9 on the stylus-grip member 8, 8A, and in a user-specified orientation, relative to a substantially planar back surface of the personal tablet-shaped device 5. In many embodiments, the stylus-grip member 8 is constructed in a similar fashion as a finger-grip member 3, as discussed herein, but adapted to sized and adapted to snuggly hold a stylus 7 (or similar tool), and usually only adapted to receive a single stylus (though in variants, multiple styluses 7 [or similar tools] can be received and snuggly held). In some variants, instead of having an elastic loop of material to snuggly grip a stylus 7, the stylus-grip member 8A employs a sturdy elastic clip mounted on a coupling surface 9 such that a stylus 7 (or similar tool) can be inserted into the clip and enjoy a slight interference fit such that the stylus 7 is securely held when in place, yet easily removed from the clip on the stylus-grip member 8A when needed.

While in most applications, the securement device 1 would incorporate a single stylus-grip member 8, 8A, multiple stylus-grip members 8, 8A could be used. It is contemplated that most applications incorporate a stand-alone stylus-grip member 8, 8A. However, in some alternative embodiments, a stylus-grip member 8, 8A could be built into one end of a finger-grip member 3, having a common base coupling substrate 9. In still more alternative variations, the stylus-grip member 8, 8A can be detachably coupled to the outer surfaces of the finger-receiving apertures 4 of a finger-grip member 3. For example, the outer surface of the finger-receiving apertures 4 can be made of a material to which the coupling substrate 9 of a stylus-grip member 8, 8A (that is, the "hook" part of a hook-and-loop coupling interface) can detachably couple.

In more embodiments, the basic principle underlying the above-described embodiments could be applied to relatively small personal, tablet-shaped, electronic devices 5 such as cell phones, wherein in an embodiment there is only a single finger-grip member 3 and that finger-grip member 3 has only one or two apertures 4 for receiving a user finger 6 (or, in a variation, perhaps two user fingers) to help a user hold onto his or her cell phone 5 while walking and doing various activities.

In yet other variations, the basic principle underlying the above-described embodiments could be applied to non-electronic, personal, hand-held, tablet-shaped devices 5 such as clip boards and other types of notebooks.

As a result of adding the apparatus described supra to a personal, hand-held, tablet-shaped device, a new and improved device 1 is formed to minimize the chance of a user inadvertently dropping his or her device and damaging it.

In still more embodiments, the personal, hand-held, tablet-shaped device 5 incorporates a partially encasing protective covering or housing (sometimes referred to in the art as "skins") made of plastic, rubber, silicone, or some other similar material, and the ergonomic user-hand-engagement apparatus 1 described herein is installed on the exterior side of the protective cover that substantially covers the back panel of the personal, hand-held, tablet-shaped device 5. Such protective coverings typically provide scratch resistance and/or shock absorption for the devices when dropped, mishandled, etc., while still having openings in the protective covering to allow a user to access controls and see the display screen; hence, such coverings are referred to herein as "partially encasing" the associated personal, hand-held, tablet-shaped device 5. In a variant of this embodiment, the back-panel coupling member 2 of the securement device is built into/formed within the back side of a protective cover that is designed to receive a personal, hand-held, tablet-shaped device 5.

Of course, a secondary use of the back-side-mounted mat 2 (that is, the back-panel coupling member 2) on the personal, hand-held, tablet-shaped device 5 is to mount the personal, hand-held, tablet-shaped device 5 on any surface that happens to have an effective mating part of a coupling scheme, discussed supra. For example, in a variation, the "loop" part of a hook-and-loop coupling scheme is disposed on the back panel of an e-reader 5 such that the e-reader 5 could be detachably mounted on any surface that can serve as the "hook" part of the hook-and-loop coupling.

Second Embodiment

An Ergonomic User-Hand-Engagement Apparatus for a Personal Tablet-Shaped Device

This embodiment is directed generally to an ergonomic user-hand-engagement apparatus for a personal, hand-held, tablet-shaped device designed to enable a user to easily and securely hold onto a personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common—while minimizing the fatigue and discomfort on the user's hands.

Refer to FIGS. 1-14. The embodiment is directed to an apparatus for holding a personal tablet-shaped device 5 in a user's hand 6, wherein the personal tablet-shaped device 5 has a substantially planar portion on its back surface. The apparatus comprises:
  a back-panel coupling member 2 configured for attachment to a substantially planar back surface of a personal tablet-shaped device 5; and
  at least one finger-grip member 3 configured for detachable coupling to the back-panel coupling member 2, wherein the at least one finger-grip member 3 can be detachably coupled to the back-panel coupling member 2 in a user-specified orientation relative to the substantially planar back surface of a personal tablet-shaped device 5.

This embodiment can be further enhanced wherein the detachable coupling between the back-panel coupling member 2 and the at the least one finger-grip member 3 is selected from the group consisting of hook-and-loop coupling, mechanical-snap coupling, and magnetic coupling.

This embodiment can be further enhanced wherein the detachable coupling between the back-panel coupling member 2 and the at least one finger-grip member 3 is a hook-and-loop coupling; the back-panel coupling member's 2 detachable coupling surface is the "loop" part of a hook-and-loop coupling; and the at least one finger-grip member's 3 detachable coupling surface is the "hook" part of a hook-and-loop coupling.

This embodiment can be further enhanced wherein the back-panel coupling member 2 is comprised of a plurality of pieces of matting, which can be various shaped and sized to accommodate the topology of the back panel of the targeted personal tablet-shaped device, each piece of which can act as a "loop" part of a hook-and-loop coupling.

This embodiment can be further enhanced wherein the detachable coupling between the back-panel coupling member 2 and the at least one finger-grip member 3 is a hook-and-loop coupling; the back-panel coupling member's 2 detachable coupling surface is the "hook" part of a hook-and-loop coupling; and the at least one finger-grip member's 3 detachable coupling surface is the "loop" part of a hook-and-loop coupling.

This embodiment can be further enhanced wherein the back-panel coupling member 2 is comprised of a plurality of pieces of matting, which can be various shaped and sized to accommodate the topology of the back panel of the targeted personal tablet-shaped device, each piece of which can act as a "hook" part of a hook-and-loop coupling.

This embodiment can be further enhanced wherein the at least one finger-grip member 3 has at least one finger-receiving aperture 4 adapted to snuggly engage one or more user fingers on a user hand 6; each at least one finger-receiving aperture 4 is oriented such that the longitudinal axis of each at least one finger-receiving aperture 4 is substantially parallel to the substantially planar back surface of the personal tablet-shaped device 5; and said snuggly engagement allows a user to securely hold the personal tablet-shaped device 5 without a user having to consciously grip the personal tablet-shaped device 5.

This embodiment can be further enhanced wherein each finger-receiving aperture 4 is adapted to receive only one user finger 6.

This embodiment can be further enhanced wherein each at least one finger-grip member 3 has a substrate adapted to detachably couple to the back-panel coupling member 2, and the at least one finger-receiving aperture 4 on the at least one finger-grip member 3 is formed by secure attachment of a strip of substantially elastic material, on each end of the strip material forming each finger-receiving aperture 4, to the substrate adapted to detachably couple to the back-panel coupling member 2, on the side of the substrate opposite of the back-panel-coupling interface of the substrate.

This embodiment can be further enhanced wherein each at least one finger-grip member 3 has at least one finger-receiving aperture 4 adapted to be adjustably fitted to a user finger 6. In a further variation of this, at least one said finger-grip member 3 finger-receiving aperture 4 is defined by a strap of material 4A that is fixedly coupled at a point along the strap 4A to the finger-grip member 3; that strap of material 4A has a "hook" part of a hook-and-loop coupling on one side, and has a "loop" part of a hook-and-loop coupling on the other side; and that strap of material 4A can be made into a variable-sized aperture 4 by detachably coupling a portion of the "loop" part of the strap 4A to a portion of the "hook" part of the strap 4A.

This embodiment can be further enhanced wherein the at least one finger-receiving aperture 4 is substantially comprised of an elastic material.

This embodiment can be further enhanced wherein the apparatus 1 is adapted for a user to hold a personal tablet-shaped device 5 selected from the group consisting of e-readers, cellular phones, tablet computers, personal data assistants, and clipboards.

This embodiment can be further enhanced wherein the apparatus 1 is adapted for a user to hold a personal tablet-shaped device 5 that is at least partially encased within a protective covering. In some variations, such a protective covering is substantially comprised of a material selected from the group consisting of plastic, rubber, and silicone, though other suitable elastic materials could also be used.

In still other variations, the back-panel coupling member 2 is configured for attachment to a substantially planar back surface on a personal tablet-shaped device 5 by being incorporated into the structure of a protective covering that is adapted to substantially encase a personal tablet-shaped device 5.

This embodiment can be further enhanced by further comprising at least one stylus-grip member 8, 8A configured for detachable coupling to the back-panel coupling member 2, wherein the at least one stylus-grip member 8, 8A can be detachably coupled to the back-panel coupling member 2 in a user-specified orientation relative to a substantially planar back surface of the personal tablet-shaped device 5. In a variation of this, the at least one stylus-grip member 8, 8A is configured for detachable coupling to the at least one finger-grip member's 3 at least one finger-receiving apertures 4. In another variation, the at least one stylus-grip member 8, 8A is fixedly attached to one end of a finger-grip member's 3 substrate adapted to detachably couple to the back-panel coupling member 2. In still more variants of this embodiment, the at least one stylus-grip member 8, 8A is a sleeve of elastomeric material, while in other variants, the at least one stylus-grip member 8, 8A is a substantially rigid clip adapted to receive a stylus 7 by way of an interference fit. In still more variations, the at least one stylus-grip member 8, 8A is configured to receive a stylus 7 selected from the group consisting of pens, pencils, computing-device touch-screen stylus, and elongated pointing devices.

Third Embodiment

A Method of Making an Ergonomic User-Hand-Engagement Apparatus for a Personal Tablet-Shaped Device This embodiment is directed generally to a method of making an ergonomic user-hand-engagement apparatus for a personal, hand-held, tablet-shaped device, designed to enable a user to easily and securely hold onto a personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common clipboard—while minimizing the fatigue and discomfort on the user's hands.

Refer to FIGS. 1-14. The embodiment is directed to a method of making an apparatus for holding a personal tablet-shaped device 5 in a user's hand 6, wherein the personal tablet-shaped device 5 has a substantially planar portion on its back surface. The method comprises the steps of:

Providing a back-panel coupling member 2 configured for attachment to a substantially planar back surface of a personal tablet-shaped device 5; and Providing at least one finger-grip member 3 configured for detachable coupling to the back-panel coupling member 2, wherein the at least one finger-grip member 3 can be detachably coupled to the back-panel coupling member 2 in a user-specified orientation relative to the substantially planar back surface of a personal tablet-shaped device 5.

This embodiment can be further enhanced wherein the detachable coupling between the back-panel coupling member 2 and the at least one finger-grip member 3 is selected from the group consisting of hook-and-loop coupling, mechanical-snap coupling, and magnetic coupling.

This embodiment can be further enhanced wherein the detachable coupling between the back-panel coupling member 2 and the at least one finger-grip member 3 is a hook-and-loop coupling; the back-panel coupling member's 2 detachable coupling surface is the "loop" part of a hook-and-loop coupling; and the at least one finger-grip member's 3 detachable coupling surface is the "hook" part of a hook-and-loop coupling.

This embodiment can be further enhanced wherein the back-panel coupling member 2 is comprised of a plurality of pieces of matting, which can be various shaped and sized to accommodate the topology of the back panel of the targeted personal tablet-shaped device, each piece of which can act as a "loop" part of a hook-and-loop coupling.

This embodiment can be further enhanced wherein the detachable coupling between the back-panel coupling member 2 and the at least one finger-grip member 3 is a hook-and-loop coupling; the back-panel coupling member's 2 detachable coupling surface is the "hook" part of a hook-and-loop coupling; and the at least one finger-grip member's 3 detachable coupling surface is the "loop" part of a hook-and-loop coupling.

This embodiment can be further enhanced wherein the back-panel coupling member 2 is comprised of a plurality of pieces of matting, which can be various shaped and sized to accommodate the topology of the back panel of the targeted personal tablet-shaped device, each piece of which can act as a "hook" part of a hook-and-loop coupling.

This embodiment can be further enhanced wherein the at least one finger-grip member 3 has at least one finger-receiving aperture 4 adapted to snuggly engage one or more user fingers on a user hand 6; each at least one finger-receiving aperture 4 is oriented such that the longitudinal axis of each at least one finger-receiving aperture 4 is substantially parallel to the substantially planar back surface of the personal tablet-shaped device 5; and said snuggly engagement allows a user to securely hold the personal tablet-shaped device 5 without a user having to consciously grip the personal tablet-shaped device 5.

This embodiment can be further enhanced wherein each finger-receiving aperture 4 is adapted to receive only one user finger 6.

This embodiment can be further enhanced wherein each at least one finger-grip member 3 has a substrate adapted to detachably couple to the back-panel coupling member 2, and the at least one finger-receiving aperture 4 on the at least one finger-grip member 3 is formed by secure attachment of a strip of substantially elastic material, on each end of the strip material forming each finger-receiving aperture 4, to the substrate adapted to detachably couple to the back-panel coupling member 2, on the side of the substrate opposite of the back-panel-coupling interface of the substrate.

This embodiment can be further enhanced wherein each at least one finger-grip member 3 has at least one finger-receiving aperture 4 adapted to be adjustably fitted to a user finger 6. In a further variation of this, at least one said finger-grip member 3 finger-receiving aperture 4 is defined by a strap of material 4A that is fixedly coupled at a point along the strap 4A to the finger-grip member 3; that strap of material 4A has a "hook" part of a hook-and-loop coupling on one side, and has a "loop" part of a hook-and-loop coupling on the other side; and the strap 4A can be made into a variable-sized aperture 4 by detachably coupling a portion of the "loop" part of the strap 4A to a portion of the "hook" part of the strap 4A.

This embodiment can be further enhanced wherein the at least one finger-receiving aperture 4 is substantially comprised of an elastic material.

This embodiment can be further enhanced wherein the apparatus 1 is adapted for a user to hold a personal tablet-shaped device 5 selected from the group consisting of e-readers, cellular phones, tablet computers, personal data assistants, and clipboards.

This embodiment can be further enhanced wherein the apparatus 1 is adapted for a user to hold a personal tablet-shaped device 5 that is at least partially encased within a protective covering. In some variations, such a protective covering is substantially comprised of a material selected from the group consisting of plastic, rubber, and silicone, though other suitable elastic materials could also be used.

In still other variations, the back-panel coupling member 2 is configured for attachment to a substantially planar back surface on a personal tablet-shaped device 5 by being incorporated into the structure of a protective covering that is adapted to substantially encase a personal tablet-shaped device 5.

This embodiment can be further enhanced by further providing at least one stylus-grip member 8, 8A configured for detachable coupling to the back-panel coupling member 2, wherein the at least one stylus-grip member 8, 8A can be detachably coupled to the back-panel coupling member 2 in a user-specified orientation relative to a substantially planar back surface of the personal tablet-shaped device 5. In a variation of this, the at least one stylus-grip member 8, 8A is configured for detachable coupling to the at least one finger-grip member's 3 at least one finger-receiving apertures 4. In another variation, the at least one stylus-grip member 8, 8A is fixedly attached to one end of a finger-grip member's 3 substrate adapted to detachably couple to the back-panel coupling member 2. In still more variants of this embodiment, the at least one stylus-grip member 8, 8A is a sleeve of elastomeric material, while in other variants, the at least one stylus-grip member 8, 8A is a substantially rigid clip adapted to receive a stylus 7 by way of an interference fit. In still more variations, the at least one stylus-grip member 8, 8A is configured to receive a stylus 7 selected from the group consisting of pens, pencils, computing-device touch-screen stylus, and elongated pointing devices.

Fourth Embodiment

A Method of Using an Ergonomic User-Hand-Engagement Apparatus for a Personal Tablet-Shaped Device This embodiment is directed generally to a method of using an ergonomic user-hand-engagement apparatus for a personal, hand-held, tablet-shaped device according to either the First or Second Embodiments, described supra, wherein the apparatus is designed to enable a user to easily and securely hold onto a personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common clipboard while minimizing the fatigue and discomfort on the user's hands.

Refer to FIGS. 1-14. The embodiment is directed to a method of using an apparatus 1 according to the First Embodiment or the Second Embodiment, described supra, in a user's hand 6. The method comprises the steps of:

Obtaining a personal tablet-shaped device 5 equipped with an apparatus 1 for securely holding the personal tablet-shaped device 5 in a user's hand 6 according to the First Embodiment or the Second Embodiment, described supra;

Inserting at least one finger of the user's hand 6 into one of said at least one finger-receiving apertures 4 disposed within the at least one finger-grip members 3; and Holding the personal tablet-shaped device 5 without needing to grip the personal tablet-shaped device 5 using the user's opposing thumb.

This embodiment can be further enhanced by further comprising the step of adjusting the placement of the back-panel coupling member 2 according to the user's preference.

This embodiment can be enhanced wherein the step for inserting at least one finger of the user's hand 6 is applied to the user's right hand, as inserted into a first finger-grip member 3, and is applied to the user's left hand 6, as inserted into a second finger-grip member 3.

This embodiment can be enhanced by further comprising the step of, before the inserting step, adjusting the position of at least one finger-grip member 3 on the back-panel coupling member 2 according to the user's preference and comfort.

This embodiment can be further enhanced by further comprising the step of adjusting the fit of at least one finger-grip member 3 finger-receiving aperture 4 over at least one user finger 6.

This embodiment can be enhanced by further comprising the steps of:

Obtaining at least one stylus-gripping member 8, 8A;

Detachably coupling the stylus-gripping member 8, 8A to the back-panel coupling member 2 in a user-specified orientation relative to the substantially planar back-panel coupling surface 2;

Selecting a stylus 7 (or similar tool), then inserting or removing the stylus 7 (or similar tool) from the stylus-grip member 8, 8A as needed.

This embodiment can be further enhanced wherein the personal tablet-shaped device 5 is selected from the group consisting of e-readers, cellular phones, tablet computers, personal data assistants, and clipboards.

Fifth Embodiment

A Kit for Assembling and Installing an Ergonomic User-Hand-Engagement Apparatus for a Personal Tablet-Shaped Device This embodiment is directed generally to a kit for assembling and installing an ergonomic user-hand-engagement apparatus onto a personal, hand-held, tablet-shaped device designed to enable a user to easily and securely hold onto the target personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common while minimizing the fatigue and discomfort on the user's hands.

Refer to FIGS. 1-14. The embodiment is directed to a kit for assembling an apparatus 1 according to the First or Second Embodiments, described supra, for securely holding a personal tablet-shaped device 5 in a user's hand, the personal tablet-shaped device 5 having a substantially planar portion on its back surface. The kit comprises:

a plurality of variously sized and shaped pieces of matting 2 (see FIG. 7) for assembling a back-panel coupling member 2 to be installed on a substantially planar back surface of a user-selected personal tablet-shaped device 5, wherein the matting pieces 2 have a first side that can be adhesively attached to the substantially planar back surface of the user-selected personal tablet-shaped device 5, the matting pieces 2 have a second side adapted to be detachably coupled to at least one finger-grip member 3, and the diversity of the variously sized and shaped pieces of matting 2 is such that a subset of those pieces of matting 2 can be assembled and installed on the substantially planar back surface of a user-selected personal tablet-shaped device 5 by a user to provide an effective coupling surface for the at least one finger-grip member 3; and a plurality of finger-grip members 3 (see FIG. 7) adapted to be detachably coupled to a back-panel coupling member 2 installed on a user-selected personal tablet-shaped device 5, wherein the plurality of finger-grip members 3 are provided in various sizes to facilitate a user's ability to select one or more properly sized finger-grip members 3 for attachment to the back-panel coupling member 2, and each of the plurality of finger-grip members 3 is adapted to be detachably coupled to the back-panel coupling member 2 in a user-specified orientation relative to the substantially planar back surface of the user-selected personal tablet-shaped device 5.

This embodiment can be further enhanced wherein the detachable coupling between the assembled and installed back-panel coupling member 2 and any user-selected finger-grip member 3 is selected from the group consisting of hook-and-loop coupling, mechanical-snap coupling, and magnetic coupling.

This embodiment can be further enhanced wherein the detachable coupling between the assembled and installed back-panel coupling member 2 and any user-selected finger-grip member 3 is a hook-and-loop coupling, the assembled and installed back-panel coupling member's 2 detachable coupling surface is the "loop" part of a hook-and-loop coupling, and the user-selected finger-grip members' 3 detachable coupling surface is the "hook" part of a hook-and-loop coupling.

This embodiment can be further enhanced wherein the detachable coupling between the assembled and installed back-panel coupling member 2 and any user-selected finger-grip member 3 is a hook-and-loop coupling, the assembled and installed back-panel coupling member's 2 detachable coupling surface is the "hook" part of a hook-and-loop coupling, and the user-selected finger-grip members' 3 detachable coupling surface is the "loop" part of a hook-and-loop coupling.

This embodiment can be further enhanced wherein each of the plurality of finger-grip members 3 has at least one finger-receiving aperture 4 adapted to snuggly engage one or more user fingers on a user hand 6; when any user-selected finger-grip member 3 is attached to a back-panel coupling member 2 assembled and installed on a user-selected personal tablet-shaped device 5, each at least one finger-receiving aperture 4 on each user-selected finger-grip member 3 is oriented such that the longitudinal axis of each of each at least one finger-receiving aperture 4 is substantially parallel to the substantially planar back surface of the user-selected personal tablet-shaped device 5; and the snuggly engagement allows a user to securely hold the user-selected personal tablet-shaped device 5 without a user having to consciously grip the user-selected personal tablet-shaped device 5.

This embodiment can be further enhanced wherein each finger-receiving aperture 4 is adapted to receive only one user finger 6.

This embodiment can be further enhanced wherein each at least one finger-grip member 3 has a substrate adapted to detachably couple to the back-panel coupling member 2, and the at least one finger-receiving aperture 4 on the at least one finger-grip member 3 is formed by secure attachment of a strip of substantially elastic material, on each end of the strip material forming each finger-receiving aperture 4, to the substrate adapted to detachably couple to the back-panel coupling member 2, on the side of the substrate opposite of the back-panel-coupling interface of the substrate.

This embodiment can be further enhanced wherein each of the plurality of finger-grip members 3 has at least one finger-receiving aperture 4 adapted to be adjustably fitted to a user finger 6.

This embodiment can be further enhanced wherein the at least one finger-receiving aperture 4 on each of the plurality of finger-grip members 3 is defined by a strap of material 4A that is fixedly coupled at a point along the strap 4A to the respective finger-grip member 3 substrate; the strap of material 4A has a "hook" part of a hook-and-loop coupling on one side, and has a "loop" part of a hook-and-loop coupling on the other side; and the strap of material 4A can be made into a variable-sized aperture 4 by detachably coupling a portion of the "loop" part of the strap 4A to a portion of the "hook" part of the strap 4A.

This embodiment can be further enhanced wherein the at least one finger-receiving aperture 4 is substantially comprised of an elastic material.

This embodiment can be further enhanced wherein the kit is adapted for a user to assemble and install a securement apparatus on a plurality of variously sized personal tablet-shaped devices selected from the group consisting of e-readers, cellular phones, tablet computers, personal data assistants, and clipboards.

This embodiment can be further enhanced wherein the kit is adapted to facilitate the assembly of an apparatus 1 for a user to hold a personal tablet-shaped device 5 that is at least partially encased within a protective covering. In other variations, the protective covering is substantially comprised of a material selected from the group consisting of plastic, rubber, and silicone, though other suitable elastic materials can be used.

In still other variations, the matting pieces 2 that comprise the back-panel coupling member 2 are configured for attachment to a substantially planar back surface on a personal tablet-shaped device 5 by being incorporated into the structure of a protective covering that is adapted to substantially encase a personal tablet-shaped device 5.

This embodiment can be further enhanced by further comprising at least one stylus-grip member 8, 8A configured for detachable coupling to the back-panel coupling member 2, wherein the at least one stylus-grip member 8, 8A can be detachably coupled to the back-panel coupling member 2 in a user-specified orientation relative to a substantially planar back surface of the personal tablet-shaped device 5. In a variation of this, the at least one stylus-grip member 8, 8A is configured for detachable coupling to the at least one finger-grip member's 3 at least one finger-receiving apertures 4. In another variation, the at least one stylus-grip member 8, 8A is fixedly attached to one end of a finger-grip member's 3 substrate adapted to detachably couple to the back-panel coupling member 2. In still more variants of this embodiment, the at least one stylus-grip member 8, 8A is a sleeve of elastomeric material, while in other variants, the at least one stylus-grip member 8, 8A is a substantially rigid clip adapted to receive a stylus 7 by way of an interference fit. In still more variations, the at least one stylus-grip member 8, 8A is configured to receive a stylus 7 selected from the group consisting of pens, pencils, computing-device touch-screen stylus, and elongated pointing devices.

Sixth Embodiment

A Method of Making a Kit for Assembling and Installing an Ergonomic User-Hand-Engagement Apparatus for a Personal Tablet-Shaped Device This embodiment is directed generally to a method for making kit for assembling and installing an ergonomic user-hand-engagement apparatus onto a personal, hand-held, tablet-shaped device designed to enable a user to easily and securely hold onto the target personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common— while minimizing the fatigue and discomfort on the user's hands.

Refer to FIGS. 1-14. The embodiment is directed to a method for making a kit for assembling an apparatus 1 according to the First or Second Embodiments, described supra, for securely holding a personal tablet-shaped device 5 in a user's hand, the personal tablet-shaped device 5 having a substantially planar portion on its back surface. The method comprises the steps of:

Providing a plurality of variously sized and shaped pieces of matting 2 (see FIG. 7) for assembling a back-panel coupling member 2 to be installed on a substantially planar back surface of a user-selected personal tablet-shaped device 5, wherein the matting pieces 2 have a first side that can be adhesively attached to the substantially planar back surface of the user-selected personal tablet-shaped device 5, the matting pieces 2 have a second side adapted to be detachably coupled to at least one finger-grip member 3, and the diversity of the variously sized and shaped pieces of matting 2 is such that a subset of those pieces of matting 2 can be assembled and installed on the substantially planar back surface of a user-selected personal tablet-shaped device 5 by a user to provide an effective coupling surface for the at least one finger-grip member 3; and Providing a plurality of finger-grip members 3 (see FIG. 7) adapted to be detachably coupled to a back-panel coupling member 2 installed on a user-selected personal tablet-shaped device 5, wherein the plurality of finger-grip members 3 are provided in various sizes to facilitate a user's ability to select one or more properly sized finger-grip members 3 for attachment to the back-panel coupling member 2, and each of the plurality of finger-grip members 3 is adapted to be detachably coupled to the back-panel coupling member 2 in a user-specified orientation relative to the substantially planar back surface of the user-selected personal tablet-shaped device 5.

This embodiment can be further enhanced wherein the detachable coupling between the assembled and installed back-panel coupling member 2 and any user-selected finger-grip member 3 is selected from the group consisting of hook-and-loop coupling, mechanical-snap coupling, and magnetic coupling.

This embodiment can be further enhanced wherein the detachable coupling between the assembled and installed back-panel coupling member 2 and any user-selected finger-grip member 3 is a hook-and-loop coupling, the assembled and installed back-panel coupling member's 2 detachable coupling surface is the "loop" part of a hook-and-loop coupling, and the user-selected finger-grip members' 3 detachable coupling surface is the "hook" part of a hook-and-loop coupling.

This embodiment can be further enhanced wherein the detachable coupling between the assembled and installed back-panel coupling member 2 and any user-selected finger-grip member 3 is a hook-and-loop coupling, the assembled and installed back-panel coupling member's 2 detachable coupling surface is the "hook" part of a hook-and-loop coupling, and the user-selected finger-grip members' 3 detachable coupling surface is the "loop" part of a hook-and-loop coupling.

This embodiment can be further enhanced wherein each of the plurality of finger-grip members 3 has at least one finger-receiving aperture 4 adapted to snuggly engage one or more user fingers on a user hand 6; when any user-selected finger-grip member 3 is attached to a back-panel coupling member 2 assembled and installed on a user-selected personal tablet-shaped device 5, each at least one finger-receiving aperture 4 on each user-selected finger-grip member 3 is oriented such that the longitudinal axis of each at least one finger-receiving aperture 4 is substantially parallel to the substantially planar back surface of the user-selected personal tablet-shaped device 5; and the snuggly engagement allows a user to securely hold the user-selected personal tablet-shaped device 5 without a user having to consciously grip the user-selected personal tablet-shaped device 5.

This embodiment can be further enhanced wherein each finger-receiving aperture 4 is adapted to receive only one user finger 6.

This embodiment can be further enhanced wherein each at least one finger-grip member 3 has a substrate adapted to detachably couple to the back-panel coupling member 2, and the at least one finger-receiving aperture 4 on the at least one finger-grip member 3 is formed by secure attachment of a strip of substantially elastic material, on each end of the strip material forming each finger-receiving aperture 4, to the substrate adapted to detachably couple to the back-panel coupling member 2, on the side of the substrate opposite of the back-panel-coupling interface of the substrate.

This embodiment can be further enhanced wherein each of the plurality of finger-grip members 3 has at least one finger-receiving aperture 4 adapted to be adjustably fitted to a user finger 6.

This embodiment can be further enhanced wherein the at least one finger-receiving aperture 4 on each of the plurality of finger-grip members 3 is defined by a strap of material 4A that is fixedly coupled at a point along the strap 4A to the respective finger-grip member 3 substrate; the strap of material 4A has a "hook" part of a hook-and-loop coupling on one side, and has a "loop" part of a hook-and-loop coupling on the other side 4A; and the strap of material 4A can be made into a variable-sized aperture 4 by detachably coupling a portion of the "loop" part of the strap 4A to a portion of the "hook" part of the strap 4A.

This embodiment can be further enhanced wherein the at least one finger-receiving aperture 4 is substantially comprised of an elastic material.

This embodiment can be further enhanced wherein the kit is adapted for a user to assemble and install a securement apparatus on a plurality of variously sized personal tablet-shaped devices selected from the group consisting of e-readers, cellular phones, tablet computers, personal data assistants, and clipboards.

This embodiment can be further enhanced wherein the kit is adapted to facilitate the assembly of an apparatus 1 for a user to hold a personal tablet-shaped device 5 that is at least partially encased within a protective covering. In other variations, the protective covering is substantially comprised of a material selected from the group consisting of plastic, rubber, and silicone, though other suitable elastic materials can be used.

In still other variations, the matting pieces 2 that comprise the back-panel coupling member 2 are configured for attachment to a substantially planar back surface on a personal tablet-shaped device 5 by being incorporated into the structure of a protective covering that is adapted to substantially encase a personal tablet-shaped device 5.

This embodiment can be further enhanced by further providing at least one stylus-grip member 8, 8A configured for detachable coupling to the back-panel coupling member 2, wherein the at least one stylus-grip member 8, 8A can be detachably coupled to the back-panel coupling member 2 in a user-specified orientation relative to a substantially planar back surface of the personal tablet-shaped device 5. In a variation of this, the at least one stylus-grip member 8, 8A is configured for detachable coupling to the at least one finger-grip member's 3 at least one finger-receiving apertures 4. In another variation, the at least one stylus-grip member 8, 8A is fixedly attached to one end of a finger-grip member's 3 substrate adapted to detachably couple to the back-panel coupling member 2. In still more variants of this embodiment, the at least one stylus-grip member 8, 8A is a sleeve of elastomeric material, while in other variants, the at least one stylus-grip member 8, 8A is a substantially rigid clip adapted to receive a stylus 7 by way of an interference fit. In still more variations, the at least one stylus-grip member 8, 8A is configured to receive a stylus 7 selected from the group consisting of pens, pencils, computing-device touch-screen stylus, and elongated pointing devices.

Seventh Embodiment

A Method of Using a Kit for Assembling and Installing an Ergonomic User-Hand-Engagement Apparatus for a Personal Tablet-Shaped Device This embodiment is directed generally to a method of using a kit for assembling and installing an ergonomic user-hand-engagement apparatus for a personal, hand-held, tablet-shaped device according to the Fifth Embodiment, described supra, wherein the apparatus is designed to enable a user to easily and securely hold onto a personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common clipboard while minimizing the fatigue and discomfort on the user's hands.

Refer to FIGS. 1-14. The embodiment is directed to a method of using a kit for assembling an apparatus 1 for securely holding a personal tablet-shaped device 5, according to the Fifth Embodiment, described supra, in a user's hand 6. The method comprises the steps of:

Obtaining a kit according to the Fifth Embodiment, described supra;

Determining the target personal tablet-shaped device 5 to install said securement apparatus 1;

Selecting at least one piece of said matting 2 (see FIG. 7) of compatible size and shape to affix to the back panel of the target personal tablet-shaped device 5, then affixing said at least one piece of matting 2 to said back panel 5;

Selecting at least one finger-grip member 3 (see FIG. 7) of compatible size for effective detachable coupling to the installed matting 2, wherein each selected finger-grip member 3 has a user-specified number of finger-receiving apertures 4; and Coupling the at least one finger-grip member 3 to the installed matting 2 at a user-specified orientation relative to the back panel of the target personal tablet-shaped device 5;

This embodiment can be enhanced by further comprising the steps of:

Inserting at least one finger of the user's hand 6 into at least one of the user-selected finger-grip members' 3 apertures 4; and Holding the target personal tablet-shaped device 5 without needing to grip the target personal tablet-shaped device 5 using the user's opposing thumb.

This embodiment can be enhanced by further comprising the steps of:

Obtaining at least one stylus-gripping member 8, 8A;

Detachably coupling the stylus-gripping member 8, 8A to the back-panel coupling member 2 in a user-specified orientation relative to the substantially planar back-panel coupling surface 2;

Selecting a stylus 7 (or similar tool), then inserting or removing the stylus 7 (or similar tool) from the stylus-grip member 8, 8A as needed.

This embodiment can be further enhanced wherein the target personal tablet-shaped device 5 is selected from the group consisting of e-readers, cellular phones, tablet computers, personal data assistants, and clipboards.

Eighth Embodiment

A Securement-Enhanced, Personal Tablet-Shaped Device

This embodiment is directed generally to a securement-enhanced, personal, hand-held, tablet-shaped device designed to enable a user to easily and securely hold onto the personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common—while minimizing the fatigue and discomfort on the user's hands.

Refer to FIGS. 1-14. The embodiment is directed to a securement-enhanced, personal tablet-shaped device 1 in a user's hand 6, wherein the personal tablet-shaped device 5 has a substantially planar portion on its back surface. The device 1 comprises:

a personal tablet-shaped device 5 having a substantially planar portion on its back surface;

a back-panel coupling member 2 attached to the substantially planar back surface on the personal tablet-shaped device 5; and at least one finger-grip member 3 detachably coupled to the back-panel coupling member 2, wherein at least one finger-grip member 3 can be detachably coupled to the back-panel coupling member 2 in a user-specified orientation relative to the substantially planar back surface of the personal tablet-shaped device 5.

This embodiment can be further enhanced wherein the detachable coupling between the back-panel coupling member 2 and the at the least one finger-grip member 3 is selected from the group consisting of hook-and-loop coupling, mechanical-snap coupling, and magnetic coupling.

This embodiment can be further enhanced wherein the detachable coupling between the back-panel coupling member 2 and the at least one finger-grip member 3 is a hook-and-loop coupling; the back-panel coupling member's 2 detachable coupling surface is the "loop" part of a hook-and-loop coupling; and the at least one finger-grip member's 3 detachable coupling surface is the "hook" part of a hook-and-loop coupling.

This embodiment can be further enhanced wherein the back-panel coupling member 2 is comprised of a plurality of pieces of matting, which can be various shaped and sized to accommodate the topology of the back panel of the targeted personal tablet-shaped device, each piece of which can act as a "loop" part of a hook-and-loop coupling.

This embodiment can be further enhanced wherein the detachable coupling between the back-panel coupling member 2 and the at least one finger-grip member 3 is a hook-and-loop coupling; the back-panel coupling member's 2 detachable coupling surface is the "hook" part of a hook-and-loop coupling; and the at least one finger-grip member's 3 detachable coupling surface is the "loop" part of a hook-and-loop coupling.

This embodiment can be further enhanced wherein the back-panel coupling member 2 is comprised of a plurality of pieces of matting, which can be various shaped and sized to accommodate the topology of the back panel of the targeted personal tablet-shaped device, each piece of which can act as a "hook" part of a hook-and-loop coupling.

This embodiment can be further enhanced wherein the at least one finger-grip member 3 has at least one finger-receiving aperture 4 adapted to snuggly engage one or more user fingers on a user hand 6; each at least one finger-receiving aperture 4 is oriented such that the longitudinal axis of each at least one finger-receiving aperture 4 is substantially parallel to the substantially planar back surface of the personal tablet-shaped device 5; and said snuggly engagement allows a user to securely hold the personal tablet-shaped device 5 without a user having to consciously grip the personal tablet-shaped device 5.

This embodiment can be further enhanced wherein each finger-receiving aperture 4 is adapted to receive only one user finger 6.

This embodiment can be further enhanced wherein each at least one finger-grip member 3 has a substrate adapted to detachably couple to the back-panel coupling member 2, and the at least one finger-receiving aperture 4 on the at least one finger-grip member 3 is formed by secure attachment of a strip of substantially elastic material, on each end of the strip material forming each finger-receiving aperture 4, to the substrate adapted to detachably couple to the back-panel coupling member 2, on the side of the substrate opposite of the back-panel-coupling interface of the substrate.

This embodiment can be further enhanced wherein each at least one finger-grip member 3 has at least one finger-receiving aperture 4 adapted to be adjustably fitted to a user finger 6. In a further variation of this, at least one said finger-grip member 3 finger-receiving aperture 4 is defined by a strap of material 4A that is fixedly coupled at a point along the strap 4A to the finger-grip member 3; that strap of material 4A has a "hook" part of a hook-and-loop coupling on one side, and has a "loop" part of a hook-and-loop coupling on the other side; and that strap of material 4A can be made into a variable-sized aperture 4 by detachably coupling a portion of the "loop" part of the strap 4A to a portion of the "hook" part of the strap 4A.

This embodiment can be further enhanced wherein the at least one finger-receiving aperture 4 is substantially comprised of an elastic material.

This embodiment can be further enhanced wherein the personal tablet-shaped device 5 is selected from the group consisting of e-readers, cellular phones, tablet computers, personal data assistants, and clipboards.

This embodiment can be further enhanced wherein the personal tablet-shaped device 5 is at least partially encased within a protective covering, including the substantially planar portion on the back surface of the personal tablet-shaped device 5. In other variations, this protective covering is substantially comprised of a material selected from the group consisting of plastic, rubber, and silicone, though other suitable elastic materials may be used.

This embodiment can be further enhanced wherein the back-panel coupling member 2 is configured for attachment to a substantially planar back surface on a personal tablet-shaped device 5 by being incorporated into the structure of a protective covering that is adapted to substantially encase a personal tablet-shaped device 5.

This embodiment can be further enhanced by further comprising at least one stylus-grip member 8, 8A configured for detachable coupling to the back-panel coupling member 2, wherein the at least one stylus-grip member 8, 8A can be detachably coupled to the back-panel coupling member 2 in a user-specified orientation relative to a substantially planar back surface of the personal tablet-shaped device 5. In a variation of this, the at least one stylus-grip member 8, 8A is configured for detachable coupling to the at least one finger-grip member's 3 at least one finger-receiving apertures 4. In another variation, the at least one stylus-grip member 8, 8A is fixedly attached to one end of a finger-grip member's 3 substrate adapted to detachably couple to the back-panel coupling member 2. In still more variants of this embodiment, the at least one stylus-grip member 8, 8A is a sleeve of elastomeric material, while in other variants, the at least one stylus-grip member 8, 8A is a substantially rigid clip adapted to receive a stylus 7 by way of an interference fit. In still more variations, the at least one stylus-grip member 8, 8A is configured to receive a stylus 7 selected from the group consisting of pens, pencils, computing-device touch-screen stylus, and elongated pointing devices.

Ninth Embodiment

A Method of Making a Securement-Enhanced, Personal Tablet-Shaped Device

This embodiment is directed generally to a method of making a securement-enhanced, personal, hand-held, tablet-shaped device designed to enable a user to easily and securely hold onto the personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common—while minimizing the fatigue and discomfort on the user's hands.

Refer to FIGS. 1-14. The embodiment is directed to a method of making a securement-enhanced, personal tablet-shaped device 1 in a user's hand 6, wherein the personal tablet-shaped device 5 has a substantially planar portion on its back surface. The method comprises the steps of:
  Providing a personal tablet-shaped device 5 having a substantially planar portion on its back surface;
  Providing a back-panel coupling member 2 attached to the substantially planar back surface on the personal tablet-shaped device 5; and
  Providing at least one finger-grip member 3 detachably coupled to the back-panel coupling member 2, wherein at least one finger-grip member 3 can be detachably coupled to the back-panel coupling member 2 in a user-specified orientation relative to the substantially planar back surface of the personal tablet-shaped device 5.

This embodiment can be further enhanced wherein the detachable coupling between the back-panel coupling member 2 and the at the least one finger-grip member 3 is selected from the group consisting of hook-and-loop coupling, mechanical-snap coupling, and magnetic coupling.

This embodiment can be further enhanced wherein the detachable coupling between the back-panel coupling member 2 and the at least one finger-grip member 3 is a hook-and-loop coupling; the back-panel coupling member's 2 detachable coupling surface is the "loop" part of a hook-and-loop coupling; and the at least one finger-grip member's 3 detachable coupling surface is the "hook" part of a hook-and-loop coupling.

This embodiment can be further enhanced wherein the back-panel coupling member 2 is comprised of a plurality of pieces of matting, which can be various shaped and sized to accommodate the topology of the back panel of the targeted personal tablet-shaped device, each piece of which can act as a "loop" part of a hook-and-loop coupling.

This embodiment can be further enhanced wherein the detachable coupling between the back-panel coupling member 2 and the at least one finger-grip member 3 is a hook-and-loop coupling; the back-panel coupling member's 2 detachable coupling surface is the "hook" part of a hook-and-loop coupling; and the at least one finger-grip member's 3 detachable coupling surface is the "loop" part of a hook-and-loop coupling.

This embodiment can be further enhanced wherein the back-panel coupling member 2 is comprised of a plurality of pieces of matting, which can be various shaped and sized to accommodate the topology of the back panel of the targeted personal tablet-shaped device, each piece of which can act as a "hook" part of a hook-and-loop coupling.

This embodiment can be further enhanced wherein the at least one finger-grip member 3 has at least one finger-receiving aperture 4 adapted to snuggly engage one or more user fingers on a user hand 6; each at least one finger-receiving aperture 4 is oriented such that the longitudinal axis of each at least one finger-receiving aperture 4 is substantially parallel to the substantially planar back surface of the personal tablet-shaped device 5; and said snuggly engagement allows a user to securely hold the personal tablet-shaped device 5 without a user having to consciously grip the personal tablet-shaped device 5.

This embodiment can be further enhanced wherein each finger-receiving aperture 4 is adapted to receive only one user finger 6.

This embodiment can be further enhanced wherein each at least one finger-grip member 3 has a substrate adapted to detachably couple to the back-panel coupling member 2, and the at least one finger-receiving aperture 4 on the at least one finger-grip member 3 is formed by secure attachment of a strip of substantially elastic material, on each end of the strip material forming each finger-receiving aperture 4, to the substrate adapted to detachably couple to the back-panel coupling member 2, on the side of the substrate opposite of the back-panel-coupling interface of the substrate.

This embodiment can be further enhanced wherein each at least one finger-grip member 3 has at least one finger-receiving aperture 4 adapted to be adjustably fitted to a user finger 6. In a further variation of this, at least one said finger-grip member 3 finger-receiving aperture 4 is defined by a strap of material 4A that is fixedly coupled at a point along the strap 4A to the finger-grip member 3; that strap 4A of material has a "hook" part of a hook-and-loop coupling on one side, and has a "loop" part of a hook-and-loop coupling on the other side; and that strap of material 4A can be made into a variable-sized aperture 4 by detachably coupling a portion of the "loop" part of the strap 4A to a portion of the "hook" part of the strap 4A.

This embodiment can be further enhanced wherein the at least one finger-receiving aperture 4 is substantially comprised of an elastic material.

This embodiment can be further enhanced wherein the personal tablet-shaped device 5 is selected from the group consisting of e-readers, cellular phones, tablet computers, personal data assistants, and clipboards.

This embodiment can be further enhanced wherein the personal tablet-shaped device 5 is at least partially encased within a protective covering, including the substantially planar portion on the back surface of the personal tablet-shaped device 5. In other variations, this protective covering is substantially comprised of a material selected from the group consisting of plastic, rubber, and silicone, though other suitable elastic materials may be used.

This embodiment can be further enhanced wherein the back-panel coupling member 2 is configured for attachment to a substantially planar back surface on a personal tablet-shaped device 5 by being incorporated into the structure of a protective covering that is adapted to substantially encase a personal tablet-shaped device 5.

This embodiment can be further enhanced by further providing at least one stylus-grip member 8, 8A configured for detachable coupling to the back-panel coupling member 2, wherein the at least one stylus-grip member 8, 8A can be detachably coupled to the back-panel coupling member 2 in a user-specified orientation relative to a substantially planar back surface of the personal tablet-shaped device 5. In a variation of this, the at least one stylus-grip member 8, 8A is configured for detachable coupling to the at least one finger-grip member's 3 at least one finger-receiving apertures 4. In another variation, the at least one stylus-grip member 8, 8A is fixedly attached to one end of a finger-grip member's 3 substrate adapted to detachably couple to the back-panel coupling member 2. In still more variants of this embodiment, the at least one stylus-grip member 8, 8A is a sleeve of elastomeric material, while in other variants, the at least one stylus-grip member 8, 8A is a substantially rigid clip adapted to receive a stylus 7 by way of an interference fit. In still more variations, the at least one stylus-grip member 8, 8A is configured to receive a stylus 7 selected from the group consisting of pens, pencils, computing-device touch-screen stylus, and elongated pointing devices.

Tenth Embodiment

A Method of Using a Securement-Enhanced, Personal Tablet-Shaped Device

This embodiment is directed generally to a method of using a securement-enhanced, personal, hand-held, tablet-shaped device designed according to the Eighth Embodiment, described supra, to enable a user to easily and securely hold onto the personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common—while minimizing the fatigue and discomfort on the user's hands.

Refer to FIGS. 1-14. The embodiment is directed to a method of using a securement-enhanced, personal tablet-shaped device 1 in a user's hand 6. The method comprises the steps of:

Obtaining a personal tablet-shaped device equipped with an apparatus for securely holding the personal tablet-shaped device in a user's hand according to the Eighth Embodiment, described supra;

Inserting at least one finger of the user's hand 6 into one of said at least one finger-receiving apertures 4 disposed within the at least one finger-grip members 3; and Holding the personal tablet-shaped device 5 without needing to grip the personal tablet-shaped device 5 using the user's opposing thumb.

This embodiment can be further enhanced by further comprising the step of adjusting the placement of the back-panel coupling member 2 according to the user's preference.

This embodiment can be enhanced wherein the step for inserting at least one finger of the user's hand 6 is applied to the user's right hand, as inserted into a first finger-grip member 3, and is applied to the user's left hand 6, as inserted into a second finger-grip member 3.

This embodiment can be enhanced by further comprising the step of, before the inserting step, adjusting the position of at least one finger-grip member 3 on the back-panel coupling member 2 according to the user's preference and comfort.

This embodiment can be further enhanced by further comprising the step of adjusting the fit of at least one finger-grip member 3 finger-receiving aperture 4 over at least one user finger 6.

This embodiment can be enhanced by further comprising the steps of:

Obtaining at least one stylus-gripping member 8, 8A;

Detachably coupling the stylus-gripping member 8, 8A to the back-panel coupling member 2 in a user-specified orientation relative to the substantially planar back-panel coupling surface 2;

Selecting a stylus 7 (or similar tool), then inserting or removing the stylus 7 (or similar tool) from the stylus-grip member 8, 8A as needed.

This embodiment can be further enhanced wherein the personal tablet-shaped device 5 is selected from the group consisting of e-readers, cellular phones, tablet computers, personal data assistants, and clipboards.

Eleventh Embodiment

An Ergonomic User-Hand-Engagement Apparatus for a Personal Tablet-Shaped Device Protective Covering This embodiment is directed generally to an ergonomic user-hand-engagement apparatus for a personal, hand-held, tablet-shaped device designed to enable a user to easily and securely hold onto a personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common— while minimizing the fatigue and discomfort on the user's hands.

Refer to FIGS. 1-14. The embodiment is directed to an apparatus for holding a personal tablet-shaped device 5 in a user's hand 6, wherein the personal tablet-shaped device 5 has a substantially planar portion on its back surface and is can be at least partially contained within a protective covering, allowing for continued access any controls and displays of the personal tablet-shaped device 5. The apparatus comprises:

- a protective covering 5A for a personal tablet-shaped device 5, said protective covering 5A adapted to substantially cover the back-panel of a personal-tablet-shaped device 5 and presenting a substantially planar outer surface;
- a back-panel coupling member 2 configured for attachment to a substantially planar back surface of a personal tablet-shaped device 5; and
- at least one finger-grip member 3 configured for detachable coupling to the back-panel coupling member 2, wherein the at least one finger-grip member 3 can be detachably coupled to the back-panel coupling member 2 in a user-specified orientation relative to a substantially planar back surface of the protective covering 5A.

This embodiment can be further enhanced, wherein the detachable coupling between the back-panel coupling member 2 and the at least one finger-grip member 3 is selected from the group consisting of hook-and-loop coupling, mechanical-snap coupling, and magnetic coupling. In variations of this, the detachable coupling between the back-panel coupling member 2 and the at least one finger-grip member 3 is a hook-and-loop coupling, wherein the "hook" and "loop" parts of the coupling can be disposed on either member, with the coupling counterpart disposed of the other. The back-panel coupling member 2 can be comprised of one or more pieces of matting to act as its part of a hook-and-loop coupling.

This embodiment can be further enhanced, wherein the at least one finger-grip member 3 has at least one finger-receiving aperture 4 adapted to snuggly engage one or more user fingers on a user hand 6, each at least one finger-receiving aperture 3 is oriented such that the longitudinal axis of each at least one finger-receiving aperture 3 is substantially parallel to the substantially planar back surface of the protective covering 5A, and the snuggly engagement allows a user to securely hold a personal tablet-shaped device 5 contained in the protective covering 5A without a user having to consciously grip the personal tablet-shaped device 5.

This embodiment can be further enhanced wherein the at least one finger-grip member 3 has a substrate adapted to detachably couple to the back-panel coupling member 2, and the at least one finger-receiving aperture 4 on the at least one finger-grip member 3 is formed by secure attachment of a strip of substantially elastic material, on each end of the strip material forming each finger-receiving aperture 4, to the substrate adapted to detachably couple to the back-panel coupling member 2, on the side of the substrate opposite of the back-panel-coupling interface of the substrate.

This embodiment can be further enhanced wherein each finger-receiving aperture 4 is adapted to receive only one user finger.

This embodiment can be further enhanced wherein each at least one finger-grip member 3 has at least one finger-receiving aperture 4 adapted to be adjustably fitted to a user finger. In a variation, the at least one said finger-grip member 3 finger-receiving aperture 4 is defined by a strap of material that is fixedly coupled at a point along the strap to the finger-grip member 3, the strap of material has a "hook" part of a hook-and-loop coupling on one side, and has a "loop" part of a hook-and-loop coupling on the other side, and the strap of material can be made into a variable-sized aperture 4 by detachably coupling a portion of the "loop" part of the strap to a portion of the "hook" part of the strap.

This embodiment can be further enhanced wherein the at least one finger-receiving aperture 4 is substantially comprised of an elastic material.

This embodiment can be further enhanced wherein the protective cover 5A is adapted for attachment to a personal tablet-shaped device selected from the group consisting of e-readers, cellular phones, tablet computers, personal data assistants, and clipboards.

This embodiment can be further enhanced wherein the protective covering 5A is substantially comprised of a material selected from the group consisting of plastic, rubber, and silicone.

This embodiment can be further enhanced by further comprising at least one stylus-grip member 8, 8A configured for detachable coupling to the back-panel coupling member 2, wherein the at least one stylus-grip member 8, 8A can be detachably coupled to the back-panel coupling member 2 in a user-specified orientation relative to a substantially planar back surface of the protective covering 5A.

This embodiment can be further enhanced by further comprising at least one stylus-grip member 8, 8A configured for detachable coupling to the at least one finger-grip member's 3 at least one finger-receiving apertures 4.

This embodiment can be further enhanced by further comprising at least one stylus-grip member 8, 8A, wherein the at least one stylus-grip member 8, 8A is fixedly attached to one end of the finger-grip member's 3 substrate adapted to detachably couple to the back-panel coupling member 2.

This embodiment can be further enhanced wherein the at least one stylus-grip member 8, 8A is a sleeve of elastomeric material.

This embodiment can be further enhanced wherein the at least one stylus-grip member 8, 8A is a substantially rigid clip adapted to receive a stylus by way of an interference fit.

This embodiment can be further enhanced wherein the at least one stylus-grip member 8, 8A is configured to receive a stylus selected from the group consisting of pens, pencils, computing-device touch-screen stylus, and elongated pointing devices.

Twelfth Embodiment

A Method of Making an Ergonomic User-Hand-Engagement Apparatus for a Personal Tablet-Shaped Device Protective Covering This embodiment is directed generally to a method of making an ergonomic user-hand-engagement apparatus for a personal, hand-held, tablet-shaped device designed to enable a user to easily and securely hold onto a personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), a cellular phone, or even just a common—while minimizing the fatigue and discomfort on the user's hands.

Refer to FIGS. 1-14. The embodiment is directed to a method of making an apparatus for holding a personal tablet-shaped device 5 in a user's hand 6, wherein the personal tablet-shaped device 5 has a substantially planar portion on its back surface and is can be at least partially contained within a protective covering, allowing for continued access any controls and displays of the personal tablet-shaped device 5. The method comprises the steps of:

Providing a protective covering 5A for a personal tablet-shaped device 5, said protective covering 5A adapted to substantially cover the back-panel of a personal-tablet-shaped device 5 and presenting a substantially planar outer surface;

Providing a back-panel coupling member 2 configured for attachment to a substantially planar back surface of a personal tablet-shaped device 5; and Providing at least one finger-grip member 3 configured for detachable coupling to the back-panel coupling member 2, wherein the at least one finger-grip member 3 can be detachably coupled to the back-panel coupling member 2 in a user-specified orientation relative to a substantially planar back surface of the protective covering 5A.

This embodiment can be further enhanced, wherein the detachable coupling between the back-panel coupling member 2 and the at least one finger-grip member 3 is selected from the group consisting of hook-and-loop coupling, mechanical-snap coupling, and magnetic coupling. In variations of this, the detachable coupling between the back-panel coupling member 2 and the at least one finger-grip member 3 is a hook-and-loop coupling, wherein the "hook" and "loop" parts of the coupling can be disposed on either member, with the coupling counterpart disposed of the other. The back-panel coupling member 2 can be comprised of one or more pieces of matting to act as its part of a hook-and-loop coupling.

This embodiment can be further enhanced, wherein the at least one finger-grip member 3 has at least one finger-receiving aperture 4 adapted to snuggly engage one or more user fingers on a user hand 6, each at least one finger-receiving aperture 3 is oriented such that the longitudinal axis of each at least one finger-receiving aperture 3 is substantially parallel to the substantially planar back surface of the protective covering 5A, and the snuggly engagement allows a user to securely hold a personal tablet-shaped device 5 contained in the protective covering 5A without a user having to consciously grip the personal tablet-shaped device 5.

This embodiment can be further enhanced wherein the at least one finger-grip member 3 has a substrate adapted to detachably couple to the back-panel coupling member 2, and the at least one finger-receiving aperture 4 on the at least one finger-grip member 3 is formed by secure attachment of a strip of substantially elastic material, on each end of the strip material forming each finger-receiving aperture 4, to the substrate adapted to detachably couple to the back-panel coupling member 2, on the side of the substrate opposite of the back-panel-coupling interface of the substrate.

This embodiment can be further enhanced wherein each finger-receiving aperture 4 is adapted to receive only one user finger.

This embodiment can be further enhanced wherein each at least one finger-grip member 3 has at least one finger-receiving aperture 4 adapted to be adjustably fitted to a user finger. In a variation, the at least one said finger-grip member 3 finger-receiving aperture 4 is defined by a strap of material that is fixedly coupled at a point along the strap to the finger-grip member 3, the strap of material has a "hook" part of a hook-and-loop coupling on one side, and has a "loop" part of a hook-and-loop coupling on the other side, and the strap of material can be made into a variable-sized aperture 4 by detachably coupling a portion of the "loop" part of the strap to a portion of the "hook" part of the strap.

This embodiment can be further enhanced wherein the at least one finger-receiving aperture 4 is substantially comprised of an elastic material.

This embodiment can be further enhanced wherein the protective cover 5A is adapted for attachment to a personal tablet-shaped device selected from the group consisting of e-readers, cellular phones, tablet computers, personal data assistants, and clipboards.

This embodiment can be further enhanced wherein the protective covering 5A is substantially comprised of a material selected from the group consisting of plastic, rubber, and silicone.

This embodiment can be further enhanced by further comprising the step of providing at least one stylus-grip member 8, 8A configured for detachable coupling to the back-panel coupling member 2, wherein the at least one stylus-grip member 8, 8A can be detachably coupled to the back-panel coupling member 2 in a user-specified orientation relative to a substantially planar back surface of the protective covering 5A.

This embodiment can be further enhanced by further comprising the step of providing at least one stylus-grip member 8, 8A configured for detachable coupling to the at least one finger-grip member's 3 at least one finger-receiving apertures 4.

This embodiment can be further enhanced by further comprising the step of providing at least one stylus-grip member 8, 8A, wherein the at least one stylus-grip member 8, 8A is fixedly attached to one end of the finger-grip member's 3 substrate adapted to detachably couple to the back-panel coupling member 2.

This embodiment can be further enhanced wherein the at least one stylus-grip member 8, 8A is a sleeve of elastomeric material.

This embodiment can be further enhanced wherein the at least one stylus-grip member 8, 8A is a substantially rigid clip adapted to receive a stylus by way of an interference fit.

This embodiment can be further enhanced wherein the at least one stylus-grip member 8, 8A is configured to receive a stylus selected from the group consisting of pens, pencils, computing-device touch-screen stylus, and elongated pointing devices.

Thirteenth Embodiment

A Method of Using an Ergonomic User-Hand-Engagement Apparatus for a Personal Tablet-Shaped Device Protective Covering This embodiment is directed generally to a method of using an ergonomic user-hand-engagement apparatus for a personal, hand-held, tablet-shaped device protective covering according to the Eleventh Embodiment, described supra, wherein the apparatus is designed to enable a user to easily and securely hold onto a personal, hand-held, tablet-shaped device such as an electronic reader (for example, Amazon Kindle®, Barnes & Noble Nook®, and the Sony eReader®), a tablet computing device (for example the Apple iPad®, Google Android®, and many others in an ever-expanding market), or a mobile phone, said electronic devices at least partially contained in a protective covering—while minimizing the fatigue and discomfort on the user's hands.

Refer to FIGS. 1-14. The embodiment is directed to a method of using an apparatus 1 according to the First or Eleventh Embodiment, described supra, in a user's hand 6. The method comprises the steps of:

Obtaining a personal tablet-shaped device 5 equipped with a protective covering 5A and an apparatus 1 for securely holding the personal tablet-shaped device 5 in a user's hand 6 according to the First Embodiment or the Eleventh Embodiment, described supra;

Inserting at least one finger of the user's hand 6 into one of said at least one finger-receiving apertures 4 disposed within the at least one finger-grip members 3; and Holding the personal tablet-shaped device 5, 5A without needing to grip the personal tablet-shaped device 5, 5A using the user's opposing thumb.

This embodiment can be further enhanced by further comprising the step of adjusting the placement of the back-panel coupling member 2 according to the user's preference.

This embodiment can be enhanced wherein the step for inserting at least one finger of the user's hand 6 is applied to the user's right hand, as inserted into a first finger-grip member 3, and is applied to the user's left hand 6, as inserted into a second finger-grip member 3.

This embodiment can be enhanced by further comprising the step of, before the inserting step, adjusting the position of at least one finger-grip member 3 on the back-panel coupling member 2 according to the user's preference and comfort.

This embodiment can be further enhanced by further comprising the step of adjusting the fit of at least one finger-grip member 3 finger-receiving aperture 4 over at least one user finger 6.

This embodiment can be enhanced by further comprising the steps of:

Obtaining at least one stylus-gripping member 8, 8A;

Detachably coupling the stylus-gripping member 8, 8A to the back-panel coupling member 2 in a user-specified orientation relative to the substantially planar back-panel coupling surface 2;

Selecting a stylus 7 (or similar tool), then inserting or removing the stylus 7 (or similar tool) from the stylus-grip member 8, 8A as needed.

This embodiment can be further enhanced wherein the personal tablet-shaped device 5, 5A is selected from the group consisting of e-readers, cellular phones, tablet computers, and personal data assistants.

Alternative Embodiments and Other Variations

The various embodiments and variations thereof described herein and/or illustrated in the accompanying Figures are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the description and figures herein.

What is claimed is:

1. A kit for assembling an apparatus for securely holding a personal tablet-shaped device in a user's hand, said personal tablet-shaped device having a substantially planar portion on its back surface, said kit comprising:

a plurality of variously sized and shaped pieces of hook-and-loop-type loop-material matting for assembling a back-panel coupling member to be installed on a substantially planar back surface of a user-selected personal tablet-shaped device, wherein said matting pieces have a first side that can be adhesively attached to said substantially planar back surface of said user-selected personal tablet-shaped device, wherein said matting pieces have a second side adapted to be detachably coupled to at least one finger-grip member, and wherein the diversity of said plurality of variously sized and shaped pieces of matting is such that one or more of said pieces of matting can be oriented and installed on said substantially planar back surface of said user-selected personal tablet-shaped device by a user to provide an effective back-panel coupling surface for said at least one finger-grip member; and at least one finger-grip member adapted to be detachably coupled to a back-panel coupling member installed on a user-selected personal tablet-shaped device, wherein:

each of said at least one finger-grip member can be detachably coupled to said back-panel coupling member in a user-specified position and orientation relative to a substantially planar back surface of said personal tablet-shaped device;

said at least one finger-grip member has a substrate adapted to detachably couple to said back-panel coupling member via a coupling surface is the "hook" part of a hook-and-loop coupling; and said at least one finger-grip member has multiple finger-receiving apertures adapted to snuggly engage two or more user fingers on a user hand;

said multiple finger-receiving apertures on said at least one finger-grip member is formed by secure and intermittently spaced attachment of a single strip of elastic material onto said substrate adapted for detachable coupling to said back-panel member, forming a substantially sinusoidal pattern, said secure attachments of elastic material occurring on the side of the substrate opposite of the back-panel-coupling interface of said substrate;

each finger-receiving aperture is oriented such that the longitudinal axis of each finger-receiving aperture is substantially parallel to said substantially planar back surface of said personal tablet-shaped device; and said snuggly engagement allows a user to securely hold said personal tablet-shaped device without a user having to consciously grip said personal tablet-shaped device.

2. The kit of claim 1, wherein said at least one finger-grip members are provided in various sizes to facilitate a user's ability to select one or more properly sized finger-grip members for attachment to said back-panel coupling member to enhance user comfort and snug engagement to user fingers.

3. The kit of claim 1, wherein each said finger-receiving aperture is adapted to receive only one user finger.

4. The kit of claim 1, wherein each at least one finger-grip member has at least one finger-receiving aperture adapted to be adjustably fitted to a user finger.

5. The kit of claim 4, wherein:
said at least one said finger-grip member finger-receiving aperture is defined by a strap of material that is fixedly coupled at a point along said strap to said finger-grip member;
said strap of material has a "hook" part of a hook-and-loop coupling on one side, and has a "loop" part of a hook-and-loop coupling on the other side; and
said strap of material can be made into a variable-sized aperture by detachably coupling a portion of said "loop" part of said strap to a portion of said "hook" part of said strap.

6. The kit of claim 1, wherein an assembled apparatus from said kit can be adapted for a user to hold a personal tablet-shaped device selected from the group consisting of e-readers, cellular phones, tablet computers, personal data assistants, and clipboards.

7. The kit of claim 1, wherein an assembled apparatus from said kit can be adapted for a user to hold a personal tablet-shaped device that is at least partially encased within a protective covering.

8. The kit of claim 1, further comprising at least one protective covering for a personal tablet-shaped device, said protective covering adapted to substantially cover a back-panel of a personal-tablet-shaped device and presenting a substantially planar outer surface for attachment of an assembled back-panel-coupling member.

9. The kit of claim 8, wherein said at least one protective coverings are provided in various sizes to facilitate a user's ability to select a properly sized protective covering for attachment to a user-selected personal tablet-shaped device.

10. The kit of claim 7, wherein said protective covering is substantially comprised of a material selected from the group consisting of plastic, rubber, and silicone.

11. The kit of claim 8, wherein at least one protective covering has a back-panel-coupling member comprised of hook-and-loop-type loop-material matting that is incorporated into the structure of said protective covering.

12. The kit of claim 1, further comprising at least one stylus-grip member configured for detachable coupling to said back-panel coupling member, wherein said at least one stylus-grip member can be detachably coupled to a back-panel coupling member in a user-specified orientation relative to a substantially planar back surface of said personal tablet-shaped device.

13. The kit of claim 12, said at least one stylus-grip member is a sleeve of elastomeric material.

14. The kit of claim 12, said at least one stylus-grip member is a substantially rigid clip adapted to receive a stylus by way of interference fit.

15. The kit of claim 12, further comprising at least one stylus-grip member configured for detachable coupling to said at least one finger-grip member.

16. The kit of claim 12, wherein said at least one stylus-grip member is configured to receive a stylus selected from the group consisting of pens, pencils, computing-device touch-screen stylus, and elongated pointing devices.

17. A method of using a kit for assembling an apparatus for securely holding a personal tablet-shaped device in a user's hand, said personal tablet-shaped device having a substantially planar portion on its back surface, said method comprising the steps of:
obtaining a kit according to claim 1;
obtaining a personal tablet-shaped device to be securely held by a user;
selecting one or more pieces of hook-and-loop-type loop-material matting in said kit and assembling a back-panel coupling member that is attached on the substantially planar back surface of said user-selected personal tablet-shaped device;
selecting at least one finger-grip member for snug engagement with a user's fingers; and
coupling said at least on finger-grip member to said back-panel-coupling member at a user-determined orientation.

18. The method of claim 17, wherein:
said kit further comprises at least one protective covering for a personal tablet-shaped device, said protective covering adapted to substantially cover a back-panel of a personal-tablet-shaped device and presenting a substantially planar outer surface for attachment of an assembled back-panel-coupling member; and
the method further comprises the step, performed before said step for assembling said back-panel-coupling member, of attaching said protective covering onto said user-selected personal tablet-shaped device.

19. The method of claim 18, wherein said at least one finger-grip member is detachably coupled to said back-panel-coupling member disposed on said protective covering.

20. The method of claim 17, wherein:
said kit further comprises at least one stylus-grip member configured for detachable coupling to said back-panel coupling member, said at least one stylus-grip member can be detachably coupled to a back-panel coupling member in a user-specified orientation relative to a substantially planar back surface of said personal tablet-shaped device; and
the method further comprises the step of attaching said at least one stylus-grip member to said back-panel-coupling member at a user-determined orientation.

* * * * *